US009088305B2

(12) United States Patent
Jurgovan et al.

(10) Patent No.: US 9,088,305 B2
(45) Date of Patent: Jul. 21, 2015

(54) DOCKING STATION CONNECTIVITY MONITOR/CONTROLLER

(71) Applicant: Research In Motion Limited, Waterloo (CA)

(72) Inventors: Jon Matthew Jurgovan, University Park, TX (US); Duc-Ngon Thi Pham, Carrollton, TX (US); Alan Kirk Stewart, Irving, TX (US); Sarah Marie Guichard, Waterloo (CA); Derek Nathaniel Johnson, Dallas, TX (US); Douglas James Arthur Burrell, Waterloo (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 81 days.

(21) Appl. No.: 13/936,648

(22) Filed: Jul. 8, 2013

(65) Prior Publication Data
US 2015/0011160 A1 Jan. 8, 2015

(51) Int. Cl.
H04B 1/38 (2006.01)
H04B 5/00 (2006.01)

(52) U.S. Cl.
CPC ............ H04B 5/0031 (2013.01); H04B 5/0037 (2013.01)

(58) Field of Classification Search
CPC ................ H04B 5/0037; H02J 5/0005; H04N 2201/0058; H04N 2201/006
USPC ......... 455/41.1, 41.2, 522, 573, 73, 566, 130; 320/108, 137; 307/104
See application file for complete search history.

(56) References Cited

U.S. PATENT DOCUMENTS

| 5,657,317 | A | 8/1997 | Mahany et al. |
| 5,864,708 | A | 1/1999 | Croft et al. |
| 6,438,622 | B1 | 8/2002 | Haghighi et al. |
| 6,549,968 | B1 | 4/2003 | Hart |
| 7,791,312 | B2 | 9/2010 | Kook |
| 8,095,072 | B2 | 1/2012 | Zheng et al. |
| 8,254,992 | B1 | 8/2012 | Ashenbrenner et al. |
| 8,260,998 | B2 | 9/2012 | Ganesh et al. |
| 8,271,662 | B1 * | 9/2012 | Gossweiler et al. .......... 709/227 |
| 8,319,782 | B2 | 11/2012 | Casparian et al. |
| 8,331,860 | B2 | 12/2012 | Sinivaara et al. |
| 2005/0238047 | A1 | 10/2005 | Holland et al. |
| 2006/0271717 | A1 | 11/2006 | Koduri et al. |
| 2010/0194335 | A1 | 8/2010 | Kirby et al. |
| 2011/0188391 | A1 | 8/2011 | Sella et al. |
| 2012/0054401 | A1 | 3/2012 | Cheng |

(Continued)

OTHER PUBLICATIONS

Wi-Fi Alliance, "Wi-Fi Certified Wi-Fi Direct," Frequently Asked Questions, Copyright 2010 Wi-Fi Alliance.

Primary Examiner — Tuan Pham
(74) Attorney, Agent, or Firm — Jeffrey N. Glunta; Fleit Gibbon Gutman Bongini & Bianco P.L.

(57) ABSTRACT

A docking station apparatus and method provides wireless power and wireless communications to a mobile device, and provides or establishes connections to one or more external devices such as monitors, keyboards, mice, printers, and networks. In response to detection of the presence of the mobile device, the docking station is enabled to transfer wireless power to the mobile device and communicate wirelessly with the mobile device. The docking station also provides or establishes connections to external devices in response to one or more connectivity assignments.

23 Claims, 18 Drawing Sheets

(56) References Cited

U.S. PATENT DOCUMENTS

| | | |
|---|---|---|
| 2012/0173765 A1 | 7/2012 | 't Hooft |
| 2012/0214462 A1 | 8/2012 | Chu et al. |
| 2012/0265913 A1 | 10/2012 | Suumaki et al. |
| 2012/0290744 A1 | 11/2012 | Stedman et al. |
| 2012/0309468 A1 | 12/2012 | King |
| 2012/0324135 A1 | 12/2012 | Goodman et al. |
| 2013/0031377 A1 | 1/2013 | Sultenfuss et al. |
| 2013/0077537 A1 | 3/2013 | Zhakov |
| 2013/0175986 A1* | 7/2013 | Senatori ........................ 320/108 |
| 2014/0036767 A1* | 2/2014 | Perugupalli et al. .......... 370/328 |
| 2014/0191712 A1* | 7/2014 | Rea et al. ...................... 320/108 |

* cited by examiner

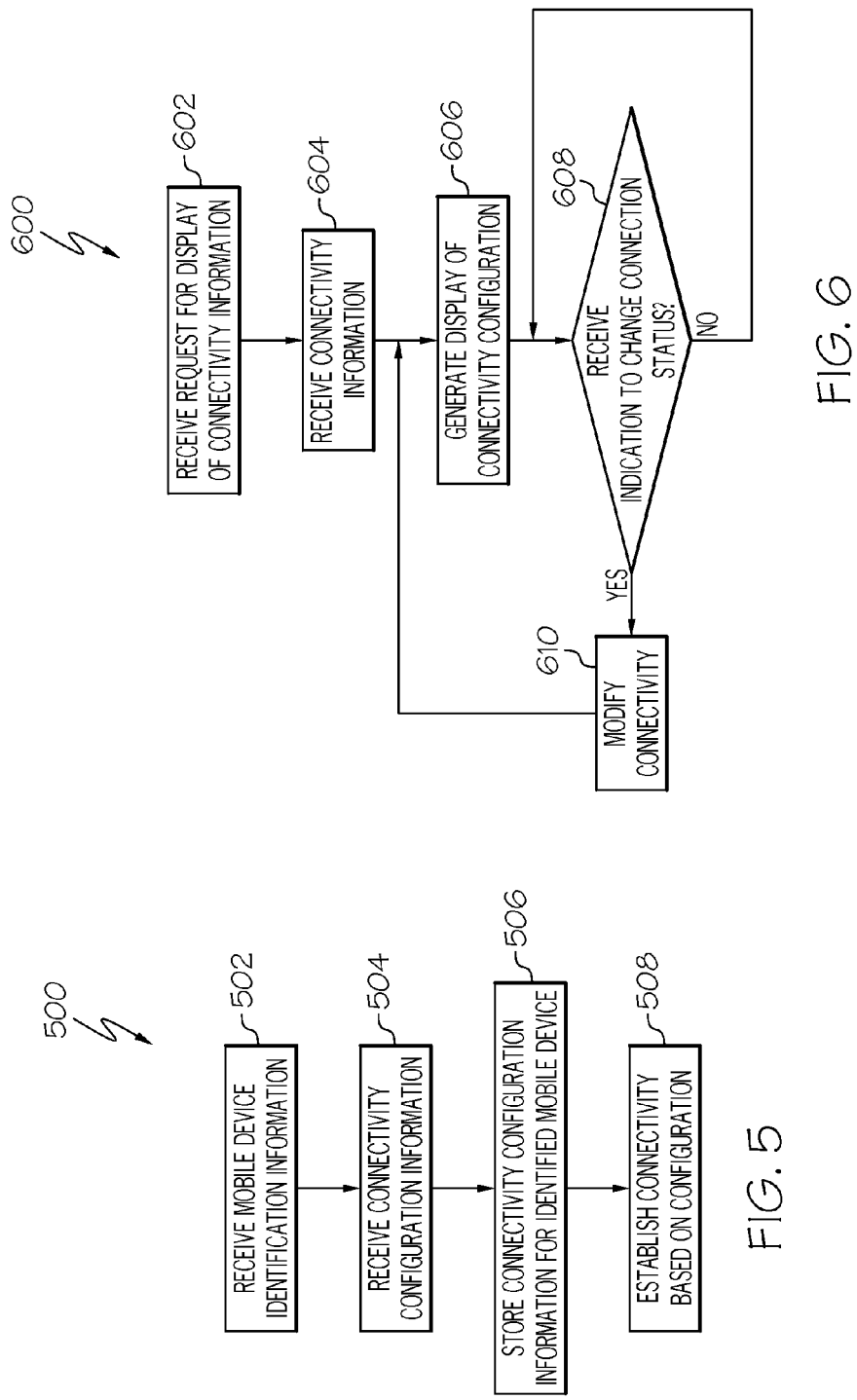

| CONNECTIONS THROUGH DOCKING CHARGING STATION | | | | | | |
|---|---|---|---|---|---|---|
| DISPLAY | SPEAKERS | KEYBOARD | MOUSE | NETWORK SERVER | MEDIA PLAYER | PRINTER-SCANNER |
| WiGig | | BLUETOOTH | BLUETOOTH | ETHERNET | | WiFi 1 |
| ON | OFF | ON | ON | ON | OFF | ON |
| 3 | 0 | 3 | 4 | 5 | 0 | 2 |

| DIRECT CONNECTIONS TO MOBILE DEVICE | | | | | | |
|---|---|---|---|---|---|---|
| DISPLAY | SPEAKERS | KEYBOARD | MOUSE | NETWORK SERVER | MEDIA PLAYER | PRINTER-SCANNER |
| | BLUETOOTH 3 | | | | WiFi 2 | |
| OFF | ON | OFF | OFF | OFF | ON | OFF |
| 0 | 5 | 0 | 0 | 0 | 4 | 0 |

FIG. 7

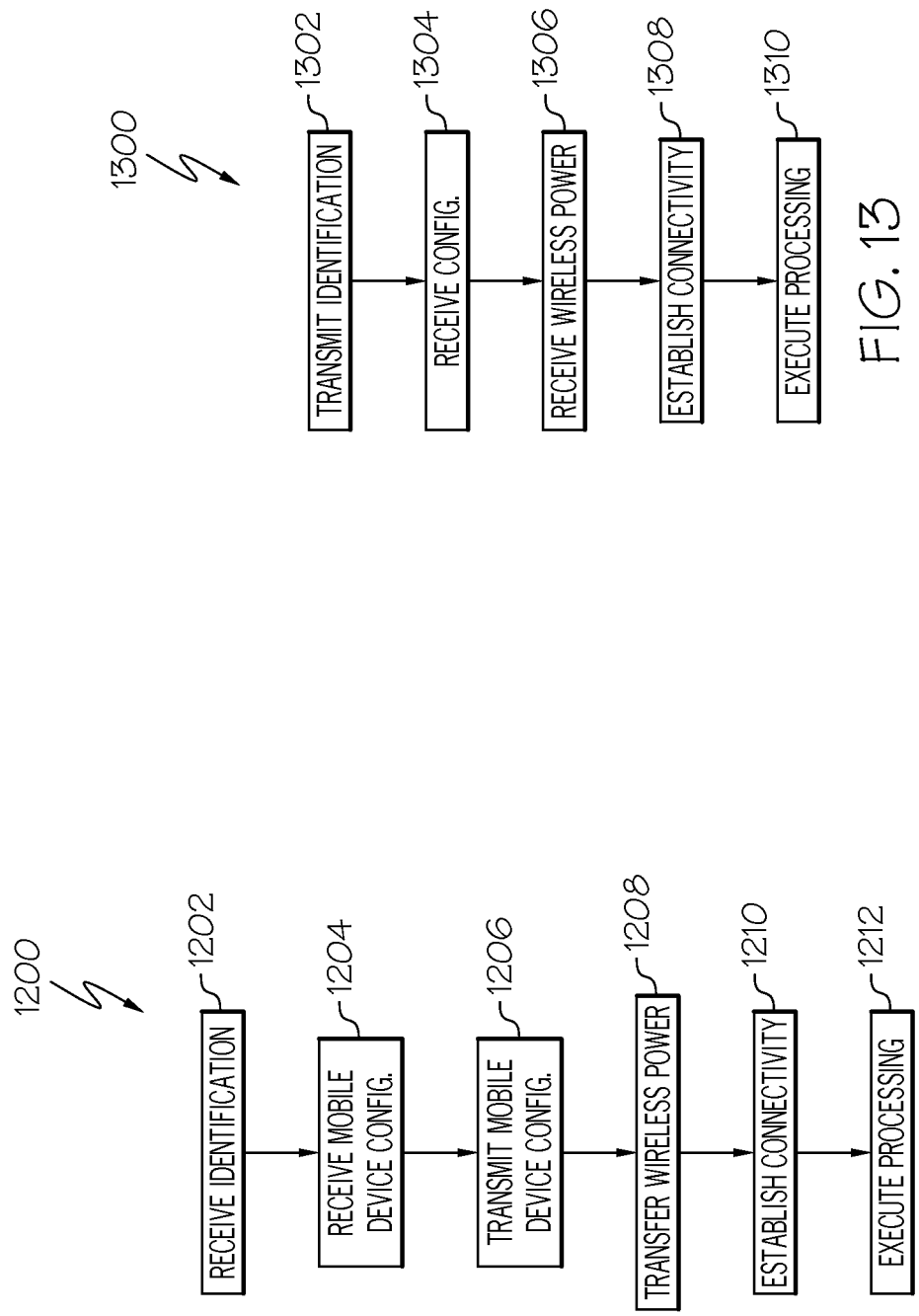

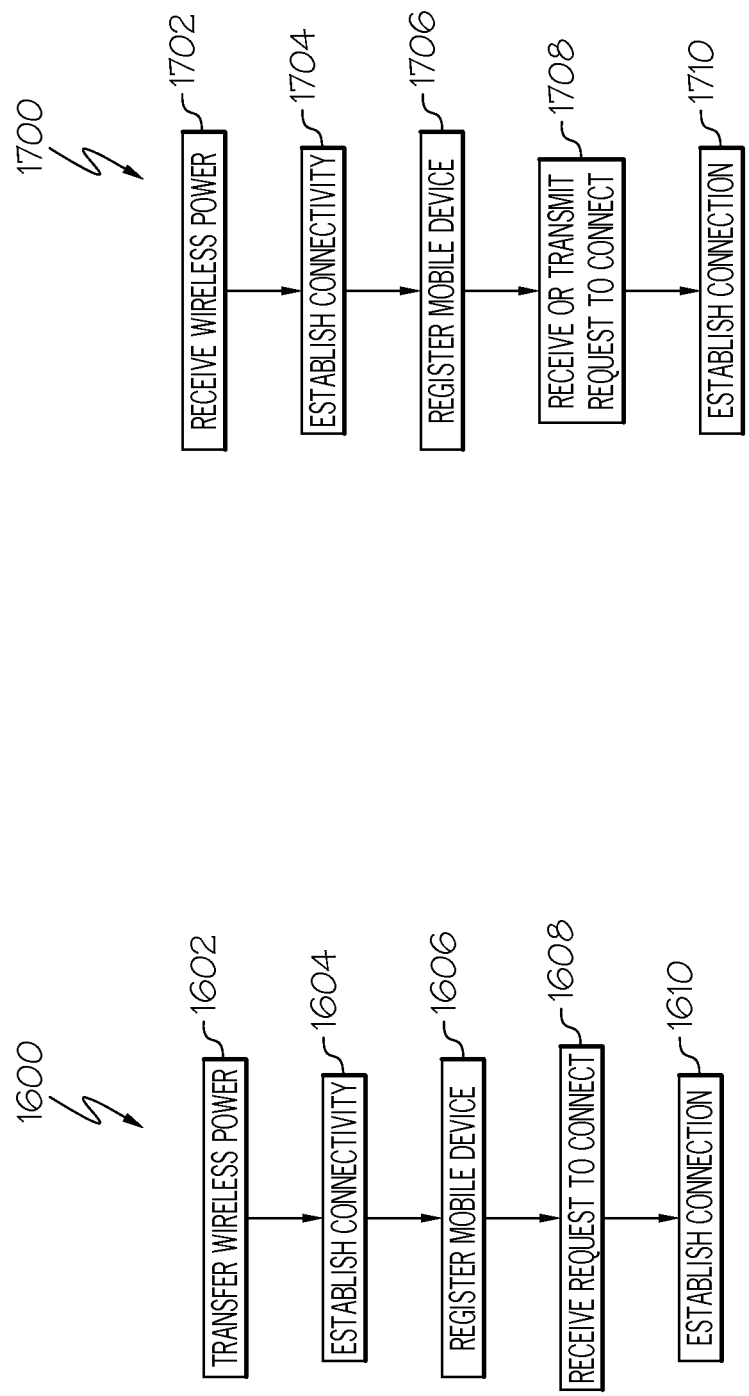

DOCKING STATION CONNECTIVITY MONITOR/CONTROLLER

FIELD OF THE DISCLOSURE

The present disclosure generally relates to communications among devices connected to a docking station, and more particularly to establishing, monitoring, modifying and controlling communications between and among devices connected to a docking station.

BACKGROUND

Mobile devices such as smart phones and tablets are becoming more versatile and powerful mobile devices. Mobile devices in some instances are able to be used as a person's primary computing platform. External devices, such as printers, data servers, other data sources, other peripherals, or combinations of these, are external devices of a computing system that are able to enhance the usefulness of mobile devices. A mobile device is able to take advantage of an external device by establishing one or more connectivity between the mobile device and the external device. The transient nature of mobile devices, however, introduces challenges in properly establishing, configuring, maintaining and otherwise controlling connectivity between the mobile device and multiple external devices. The desirability of utilizing external devices with a mobile device increases as the mobile device is used more fully as a primary computing platform.

The usability of mobile devices that are used as a primary mobile device, or that are otherwise used more frequently by a user, increases through the ability to easily and continuously provide electrical power to the mobile device. Wireless charging stations, which are sometimes in the form of a plate or mat onto which a mobile device is placed, are able to easily, conveniently, and continuously provide electrical power to a mobile device by merely placing the mobile device on the plate or mat.

The usability of mobile devices is enhanced by providing convenient facilities to establish, configure, maintain, monitor, and otherwise control communications and power connectivity between a mobile device and external devices.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 illustrates a docking station connectivity processing flow, according to an example;

FIG. 6 illustrates a connectivity display processing flow, according to one example;

FIG. 7 illustrates an external device connectivity display, according to an example;

FIG. 12 illustrates a docking-charging station device configuration definition processing flow, according to one example;

FIG. 13 illustrates a mobile device configuration definition processing flow, according to one example;

FIG. 16 illustrates is a docking-charging station network connectivity processing flow, according to an example;

FIG. 17 illustrates is a mobile device network connectivity processing flow, according to an example;

DETAILED DESCRIPTION

Figure 1:
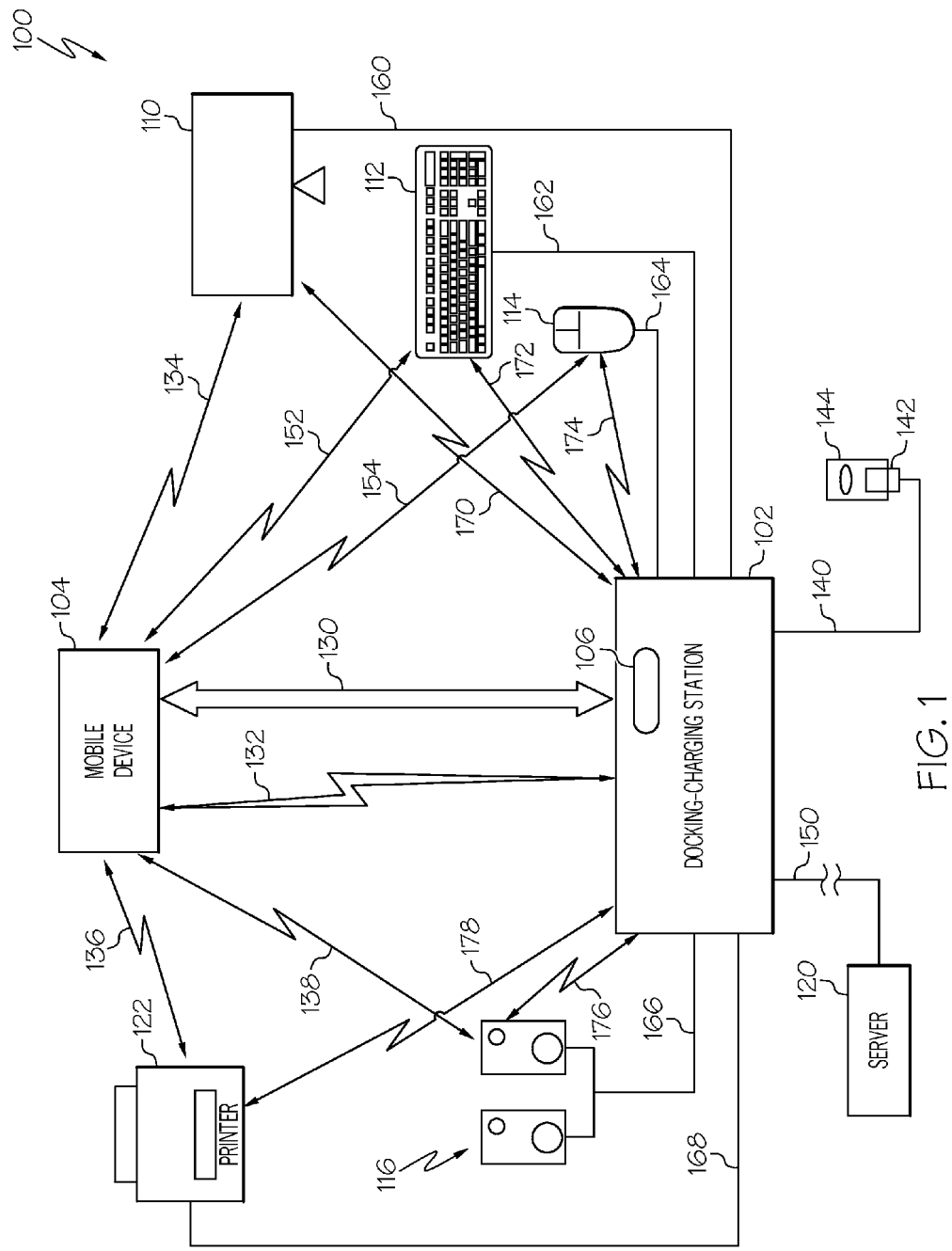
FIG. 1 illustrates a docking station interconnection diagram, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). According to context, the term "coupled," as used herein, is generally defined as "connected," although not necessarily directly, and not necessarily mechanically. In the case of inductive coupling, there may be no physical connection between components, as inductive coupling between two coils can occur under circumstances in which a current in one induces a current in the other even if the coils are separated. In various examples, electrical energy is able to be coupled through at least three mechanisms, inductive coupling, capacitive coupling, or magnetic resonance. Components that are "communicatively coupled" are configured to communicate (that is, they are capable of communicating) in any fashion for any duration, such as by way of electric signals, optical signals, wireless signals, or any combination thereof. The terms "connection" and "connectivity" are likewise are intended to be construed broadly to include any media supporting, or capable of supporting, communication between two devices, including electric signals, optical signals, wireless signals, or any combination thereof.

Communicatively coupled components are able to be directly connected to one another, connected through any combination of intermediate physical components or other elements that support communications between the communicatively coupled components, connected at least in part by one or more electromagnetic, optical or similar communications medium, by one or more other coupling components, or by combinations of these. The terms "configured to" and "adapted to" describe hardware, software or a combination of hardware and software that is (according to context) capable of, set up, arranged, built, composed, constructed, designed, able to accommodate or make, suitable to carry out or that has any combination of these characteristics to carry out a given function. In the following discussion, "handheld" is used to describe items, such as "handheld devices," that are sized, designed and otherwise configured to be carried and operated while being held in a human hand.

The below described systems and methods include devices and components that communicate with one another. In the following discussion, communications between devices or components is able to include one-way communications, two-way communications, or both. An example of one-way communications is a transmitting device or component sends or transmits data to a receiving device that receives the data. Examples of two-way communications include two devices with each device being configured to both transmit and receive data, and each of the two devices operate to both send data to the other device and to also receive data from the other device. The transmission from the two devices operating in two-way communications is able to occur simultaneously, which is referred to as full duplex communications, at different times, which is referred to as half duplex communications, or both. In one example, devices are able to operate in both one-way communications and two-way communications at different times. Further, devices are able to communicate data with more than one other device, such as in a broadcast mode, in either a one-way mode (e.g., by only performing one of transmit or receive operations), or in a two-way mode (e.g. by performing both transmit and receive operations).

The below described systems and methods provide efficient monitoring and control of interactions between a mobile device, such as a mobile device, a docking station and external devices connected to the docking station. In some examples, the docking station includes wireless power transfer capabilities that are able to wirelessly deliver power to the mobile device to, for example, operate circuits or other elements of the mobile device, recharge power packs within the mobile device, provide power for other uses, or combinations of these.

The mobile device and the docking station in one example communicate data via a docking station wireless connection. In the following discussion, the term "docking station wireless connection" refers to wireless data communication connectivity that supports data communication between the mobile device and the docking station. The mobile device is then able to configure connectivity to access external devices, such as user interface devices, printers, speakers, or any other external device, that has data connectivity with the docking station. The mobile devices in some examples are further able to establish direct wireless data connectivity with the external devices that have data connectivity with the docking station, thereby providing the option of either direct data communications with the external devices or data communications through the docking station. In the following discussion, connectivity refers to data communication between devices, such as between the mobile device 104 and various external devices as are described below. Some examples support configuration definitions for configuring and selecting which connectivity to use to communicate between the mobile device and the external devices. In some examples, a user display is presented to indicate which connectivity is configured for such communications. Inputs, from a user or other source, are further able to be provided to cause reconfiguration of the connectivity. In some examples, configuration definitions are able to be created and modified that define connectivity and other interactions between the mobile device and the docking station.

Configuring connectivity and displaying the present connectivity to a user has various advantages. For example, under circumstances in which a mobile device is connected to a docking station through a docking station wireless connection, data communications to devices through connectivity that go through the docking station will be lost as a result of the termination of the docking station wireless connection. Such termination may be, for example, due to the mobile device moving away from the docking station, or due to the docking station wireless connection being unreliable. A user may wish to use direct wireless connectivity for some external devices, such as displays and keyboards, while routing data through the docking station for some external devices, such as more distant printers or other external devices.

Other interactions between the mobile device and the docking station are also able to be specified and controlled in some examples. For example, processing is able to be off-loaded from the mobile device to the docking station or other processing external device, or on-loaded from a processor onto the mobile device. Such distribution of processing allows, for example, control of the power consumed by the mobile device in order to accommodate more rapid battery charging or to utilize the processor in the mobile device under circumstances in which its battery is charged.

FIG. 1 illustrates a docking station interconnection diagram 100, according to an example. The docking station interconnection diagram 100 illustrates an example of a docking-charging station 102 that is able to wirelessly transfer power to a mobile device 104 and to communicate data in one or both directions between the docking station 102 and the mobile device 104. The mobile device 104 converts the transferred power into electrical power for use by the mobile device 104, such as for operation of components within the mobile device, to charge an electrical energy storage device, such as a battery or other power pack, within the mobile device, or both. The mobile device 104 is able to be, for example, a handset, tablet, any other type of device, combinations, or variations of these.

The exterior of the docking-charging station 102 is able to have any suitable shape or configuration. For example, a portion of the enclosure for the docking-charging station 102 is able to have a surface with a tabular or circular configuration onto which the mobile device 104 is able to be placed to facilitate power transfer, data transfer, or both, between the docking-charging station 102 and the mobile device 104. In one example, a wireless power transmitter 106 is included within the docking-charging station 102 and operates to wirelessly transmit power to the mobile device 104 through a wireless power transfer signal 130. The docking station interconnection diagram 100 is a schematic diagram that is drawn to primarily depict the interconnections between components, particularly wireless interconnections that convey power, data, or both, in one or both directions. Although the mobile device 104 is shown at a distance from the docking-charging station 102, in some examples the mobile device 104 is placed directly on a surface of the docking-charging station 102. The docking-charging station 102 in this example includes a power cord 140 with a plug 142 that is able to be connected to suitable power source, such as a conventional wall socket power outlet 144.

A common use of wireless power transfer between the docking-charging station 102 and the mobile device 104 is to transfer power to the mobile device 104 through the wireless power transfer signal 130 in order to charge a power pack, such as a battery, of the mobile device 104. The wireless power transfer performed between the docking-charging station 102 and the mobile device 104 is able to be referred to as "wireless charging." Although the wireless power transfer from a docking-charging station 102 to a mobile device 104 is referred to as wireless charging, it is to be understood that the power transferred by so called "wireless charging" techniques is also able to be used for other purposes by the mobile device 104 receiving the power, such as to operate circuits, user interfaces, motors, other components, or combinations of these. Wireless charging of mobile devices is described U.S. patent application Ser. No. 13/253,478, which was filed on Oct. 5, 2011 and entitled "WIRELESS CHARGING AND COMMUNICATION WITH POWER SOURCE DEVICES AND POWER CHARGE DEVICES IN A COMMUNICATION SYSTEM". U.S. patent application Ser. No. 13/253,478 is hereby incorporated herein by reference in its entirety.

Many techniques are able to be used to wireless transfer energy between, for example, the docking-charging station 102 and the mobile device 104. Examples include inductive coupling, capacitive coupling, or magnetic resonance. Several standards are able to be used to allow the interoperability of devices in performing wireless energy transfer. Example entities defining wireless energy transfer standards include the Wireless Power Consortium, the Power Matters Alliance, the NFC Forum, the Alliance for Wireless Power, the China Communications Standards Association, and the International Telecommunications Union (ITU). The systems and methods described herein are able to comply with, or incorporate elements of, one or more elements of one or more of these standards.

The docking station interconnection diagram 100 further depicts a number of external devices that are able to communicate data with the mobile device 104 either directly, through the docking-charging station 102, or both. In this description, the term external device refers broadly to any device with which data is able to be communicated by, for example, either one or both of sending data to the external device or receiving data from the external device. Further, the docking-charging station 102 itself is able to communicate data with these external devices. The docking-charging station 102 in this example operates as a docking station or base station for the mobile device 104 such that the mobile device 104 is able to establish a docking station wireless connection 132 with the docking-charging station 102 in order communicate data with the external devices connected to the docking-charging station 102. In the following discussion, the described "establishing" of a connectivity, such as establishing the docking station wireless connection 132 or other connectivity, is intended to include actions such as activating, enabling, securing, or initiating the connectivity, and to also include also actions that include furnishing, supplying, making available, or maintaining the connectivity once the connectivity is activated, enabled, secured, or initiated. In various examples, the docking station wireless connection 132 is able to include a short range, high speed wireless connectivity such as a Near-Field Communications (NFC) data communications, WiFi®, a wireless connectivity conforming to any specification, or combinations of these. As described below, the docking station wireless connection 132 is able to be established based upon one or more different criteria, such as a detection of receipt of a wireless power transfer signal 130, a detection of a related data communications signal emanating from the docking-charging station 102, other criteria, or combinations of criteria.

The docking station interconnection diagram 100 depicts external devices that include a monitor 110, speakers 116, a keyboard 112, a mouse 114, a remote server 120 or other computer, and a printer/scanner 122. These external devices are able to communicate data with the mobile device 104, the docking-charging station 102, or both, through one or both of wired data paths and wireless data paths. In the illustrated example, the docking-charging station is connected to the monitor 110 through a wired display connectivity 160 and a wireless display connectivity 170, to speakers 116 through a wired speaker connectivity 166 and a wireless speaker connectivity 176, to a keyboard 112 through a wired keyboard connectivity 162 and a wireless keyboard connectivity 172, to a mouse 114 through a wired mouse connectivity 164 and a wireless mouse connectivity 174, to a remote server 120 through a wired server connectivity 150, and to a printer/scanner 122 through a wired printer scanner connectivity 168 and a wireless printer/scanner connectivity 178. The depicted wired connectivity between the docking-charging station 102 and the various external devices are able to be either individual connectivity, such as over Universal Serial Bus (USB) connections, a shared data network, such as an Ethernet based network, that connects two or more external devices to the docking-charging station 102, or combinations of these. The docking-charging station 102 in one example operates as a "docking station" whereby a mobile device 104 is able to establish a docking station wireless connection 132 with the docking-charging station 102 and access the external devices attached to the docking-charging station 102 through one or more connectivity.

For example, a mobile device 104 is able to establish the docking station wireless connection 132 with the docking-charging station 102 and thereby access or otherwise utilize the printer/scanner 122, the speakers 116, monitor 110, keyboard 112 and mouse 114, other external devices, or any combination of external devices that are connected to the docking-charging station 102. For example, the mobile device 104 is able to send data representing documents to the printer/scanner 122 through the docking-charging station 102 in order to print those documents. The mobile device 104 is further able to communicate data, processing tasks, other information, or combinations of these with the remote server 120, as is described in further detail below. In the following discussion, a communications channel that includes the docking station wireless connection 132 that is used to communicate data between that external device and the mobile device 104 is referred to as a docking station connection route.

In addition to the mobile device 104 accessing one or more of these external devices through the docking-charging station 102 via docking station connection routes that include the docking station wireless connection 132, the mobile device 104 is also, or alternatively, able to establish direct wireless connectivity with one or more of those external devices and access those external devices directly. In accessing those external devices directly, the mobile device 104 does not use the docking station wireless connection 132. In the example illustrated docking station interconnection diagram 100, the mobile device 104 is able to establish a direct monitor wireless connectivity 134, a direct printer/scanner wireless connectivity 136, a direct speakers wireless connectivity 138, a direct keyboard wireless connectivity 152, and a direct mouse wireless connectivity 154. The mobile device 104 in this example is able to access these external devices either through the docking-charging station 102 using docking station connection routes, through direct wireless connectivity, or through both. In further examples, a mobile device 104 is able to access other devices or fewer devices through direct wireless connectivity. In one example, the mobile device is able to access external devices that are not connected to the docking-charging station 102 by establishing direct wireless connectivity with those external devices.

In the following discussion, a data communications channel between a particular external device and either the mobile device 104 or the docking-charging station 102 is referred to as connectivity between that particular external device and the mobile device 104 or the docking-charging station 102. As described in further detail below, the mobile device 104 in one example allows a selection of which connectivity the mobile device 104 is to use for communications with each external device for which more than one communications channel, e.g., a direct wireless connectivity and a docking station connection route that includes the docking station wireless connection 132, is available. For example, the mobile device is able to have a direct wireless connectivity with the keyboard 112 and mouse 114, and connectivity via the docking station wireless connection 132 through the docking-charging station 102 for communications with the monitor 110 and printer/scanner 122. The particular selected connectivity between the mobile device 104 and the various external devices are able to be selected in one example by a graphical user interface presented on the mobile device 104, by a configuration definition specified for the mobile device 104. In general, a configuration definition is specified by a configuration definition data set that is stored on either the mobile device 104 or on a storage device accessible to the docking-charging station 102, or both. Further, the mobile device is able to provide a display that indicates which connectivity, e.g., a direct connectivity or connectivity through the docking-charging station, is used to communicate between the mobile device 104 and each external device.

In the following discussion, the term "connectivity assignment" refers to the set of selected connectivity that are defined to support communications between the mobile device 104 and the various external devices that are connected to the docking-charging station 102. In one particular example, a connectivity assignment is able to define selected data connectivity for the mobile device 104 such that the mobile device 104 has direct wireless connectivity with the keyboard 112 and mouse 114, and docking station connection routes that include the docking station wireless connection 132 for communications with the monitor 110 and printer/scanner 122. Connectivity assignments are further able to include wired connectivity between the mobile device 104 and other external devices. In one example, the connectivity assignment merely defines whether the mobile device 104 has a direct connectivity (wireless or otherwise) to a particular external device, or if the connectivity to the particular external device is through the docking station wireless connection 132, and thus through the docking-charging station 102. In one example, the nature of the connectivity between various external devices and the docking-charging station 102, e.g., whether the connectivity is wired, wireless, both, or otherwise, is not defined by the connectivity assignment.

As described below, the docking-charging station 102 is able to include processing resources, such as a local microprocessor, access to remote computers that are able to perform processing, any other type of computer processing resource, or combinations of these. A docking-charging station 102 with processing resources is able to be configured to receive processing tasks from the processor within the mobile device 104, provide processing tasks to be performed by a processor within the mobile device 104, or combinations of these. Providing tasks to the processor of the docking-charging station 102, which is referred to as "offloading," or providing processing tasks to the processor of the mobile device, referred to herein as "onloading," provides flexibility in allocating processing load and commensurate power consumption between the docking-charging station 102 and the mobile device 104. For example, onloading permits the processing power of the mobile device 104 to be utilized. Conversely, offloading allows the docking-charging station 102 to receive offloaded functions from the mobile device 104 to reduce its power consumption and allow more of the wirelessly transferred power received by the mobile device 104 to be used to charge power packs in the mobile device 104 in order to increase the rate of charging of that power pack.

Figure 2:
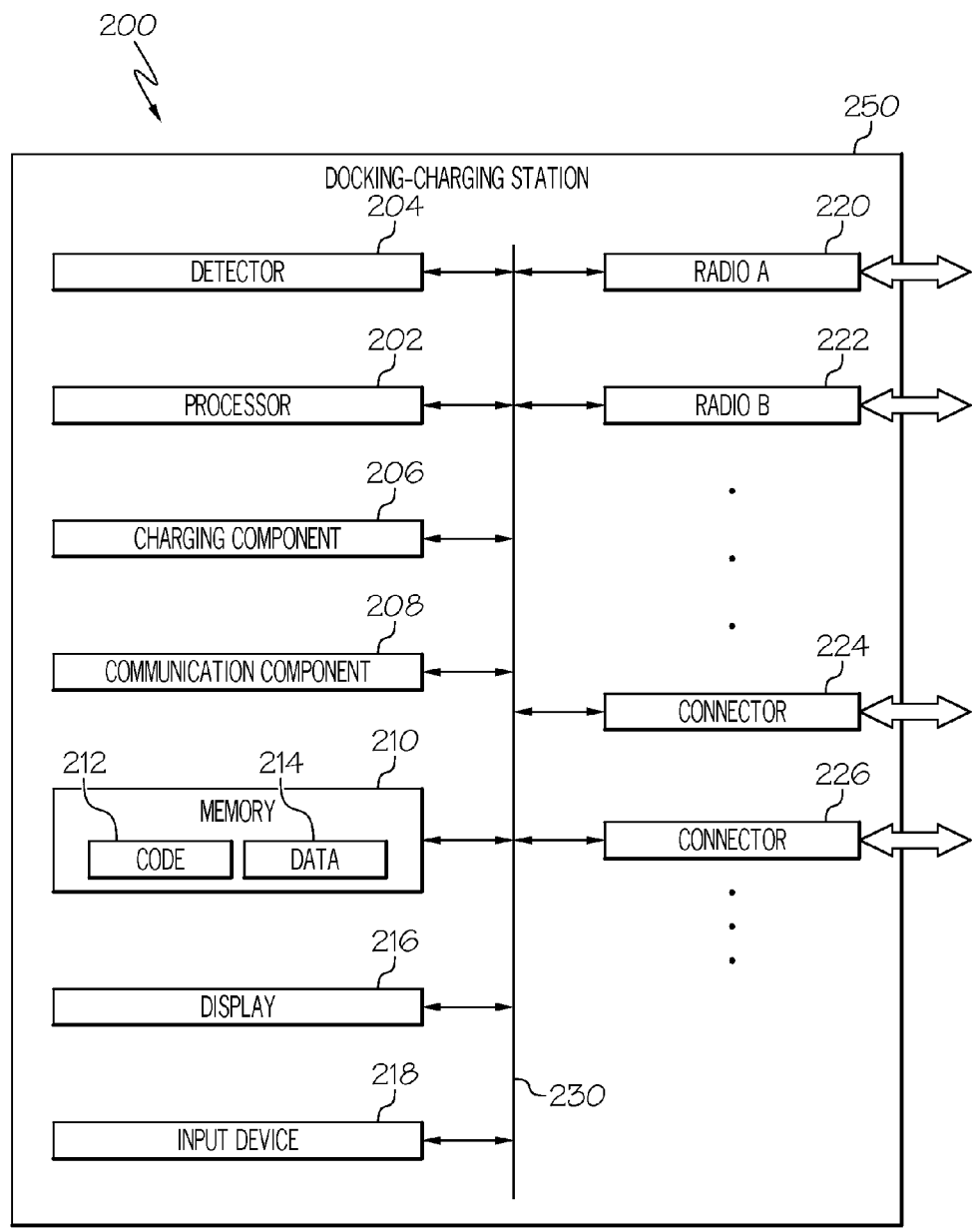
FIG. 2 illustrates a docking-charging station block diagram, according to an example.

FIG. 2 illustrates a docking-charging station block diagram 200, according to an example. The docking-charging station block diagram 200 depicts the components of a docking-charging station 250, which is an example of a docking-charging station 102 as is described above with regards to FIG. 1. The description of the docking-charging station block diagram 200 describes interactions between components associated with or within the docking-charging station 102 and other devices that are described above in reference to FIG. 1.

The docking-charging station block diagram 200 depicts a communications bus 230 that supports the communication of data, other information, electrical power, and other elements, between or among the various components depicted in the docking-charging station block diagram 200. The communications bus 230 is able to consist of a single data communications architecture or bus, or the communications bus 230 is able to include multiple data, power, or data and power communications or conveyance structures that are within or attached to the docking-charging station 250.

The docking-charging station block diagram 200 depicts a processor 202 that performs various processing to support operations of the docking-charging station 250. The processor 202 communicates program code 212 and data 214 with memory 210 over the communications bus 230. The processor 202 executes the received program code 212 and uses the received data 214 as appropriate to perform the processes described herein.

The docking-charging station block diagram 200 includes a detector 204 that operates to detect a presence or absence of a nearby mobile device, such as the above described mobile device 104. The detector 204 is an example of a proximity detector that, in one example, generates a proximity detection signal to alert the processor 202 to indicate the detected presence of the mobile device and, in some examples, an indication of an estimate of the distance between the docking-charging station 250 and the mobile device 104. The detector 204 in some examples include an optical sensor, an electrical sensor, a magnetic sensor, a pressure sensor, other sensor adapted to detect positioning of the mobile device, or combinations of these sensors. The detector 204 in one example detects the presence of a mobile device under circumstances in which the mobile device is within 5 cm of the docking-charging station.

The processor 202 in one example receives wireless power transfer information to use in providing wireless power to the mobile device. In one example, the wireless power transfer information is stored in data 214 within memory 210 and the processor operates to retrieve the wireless power transfer information in response to receiving the proximity detection signal from the detector 204. Alternatively, or in addition, the mobile device is able to send wireless power transfer information to the docking-charging station 250. The wireless power transfer information in one example indicates parameters for the amount of power to be transferred to the mobile device. The wireless power transfer information may include parameters such as a maximum power that is to be transferred to the mobile device, a maximum power transfer rate, other power transfer information, or combinations of these.

The docking-charging station block diagram 200 includes a charging component 206 that operates to transfer power from the docking-charging station 250 to a mobile device. The processor in one example activates the charging component 206 to transfer wireless power to the mobile device in accordance with the parameters specified in the wireless power transfer information received by the processor 202. In one example, the charging component 206 includes an inductive coil, a capacitive plate, magnetic resonator, or combinations of these, to transfer wireless power electro-magnetically to the mobile device.

The docking-charging station block diagram 200 also includes connectivity units 208. The connectivity units 208 enable the processor 202 to communicate with a mobile device that is near the docking-charging station 250. The connectivity units 208 can include one or more optical communications devices, one or more inductive coils, one or more capacitive plates, one or more magnetic resonators, or combination of these, to transmit wireless communication signals to a mobile device 104 that is near the docking-charging station 250. In one example, Near Field Communications (NFC) technology can be used to support communication between the docking-charging station 250 and mobile device. Information conveyed between the docking-charging station and the mobile device through the connectivity units 208 include, for example, information such as an amount of power to transfer to the mobile device, specifications of any connectivity the docking-charging station is to provide between the mobile device 104 and other external devices connected to the docking-charging station 250, such as one or more of the monitor 110 and other external devices described above with regards to FIG. 1. The connectivity units 208 are further able to convey information, program code, other data, or combinations of these that are associated with the onloading of processing to or the offloading of processing from the mobile device with respect to processing resources available to the docking-charging station 250.

The docking-charging station 250 also includes a user interface that in this example includes a display unit 216 and an input device 218. The processor 202 receives input from the input device 218 and generates a display on the display unit 216. For example, the processor 202 can generate a display of connectivity status of wired or wireless connectivity of the docking-charging station 250 or mobile device to other external devices. Moreover, the input device 218 and display unit 216 are able to provide a user interface to allow a user to modify connectivity between external devices, such as monitor 110 or other external devices discussed above with respect to FIG. 1 and the docking-charging station 102 or mobile device 104.

The docking-charging station 250 is able to include one or more connectivity units, such as the illustrated two radio units Radio A 220 and Radio B 222. In further examples, a docking charging station 250 is able to include any suitable number or connectivity units, such as radios that communicate via any suitable ratio protocol. In one example, each radio unit, such as either or both of Radio A 220 and Radio B 222, include one or more antennas and a radio transceiver that includes facilities to perform processing to implement any data communications protocol stack that are used to support any communications connectivity for data, voice, video, other types of connectivity, or any combination of these. In one example, the connectivity units such as Radio A 220 and Radio B 222 are able to support one or more of data communications over Bluetooth compliant radio paths, data communications complying with one or more sets of data communication protocols defined under the IEEE 802.11 standard, communications conforming to the WiGig standard, data communications over Near Field Communications (NFC), communications over a wireless voice or data cellular network such as networks conforming to the Global System for Mobile (GSM) standard, the General Packet Radio Service (GPRS) standard, over cellular data networks implementing the EDGE standard, cellular data networks communicating via Code Division Multiple Access (CDMA) modulation techniques, data or voice communications conforming to the Universal Mobile Telecommunications System (UMTS), Long Term Evolution (LTE), Long Term Evolution-Advanced (LTE-A) standards, any other data or voice communications standard, or any combination of these. In one example, a docking-charging station 250 establishes and maintains the above described docking station wireless connection 132 through one or more connectivity units, such as Radio A 220 and Radio B 222.

The docking-charging station 250 is further able to include physical electrical data communications connectors, such as the two illustrated Connector A 224 and Connector B 226. In further examples, a docking-charging station is able to include any number of physical electrical connectors that convey one or more of data, electrical power, voice, analog signals, any other type of signal, or combinations of these. Further, one or more physical connectors are able to convey data, voice, any static or time varying quantity, or combinations of these, over conductive electrical paths, optical communications path, other communications paths, or combinations of these. The physical electrical data communications connectors are able to operate with the connectivity units 208 to perform various communications functions with external devices, a mobile device, or both.

Examples of communications standards supported by various examples of physical connectors, such as Connector A 224 and Connector B 226 include connectors conforming to standards defined for Ethernet network data communications connectors, Universal Serial Bus (USB) data communications connectors, a Tip Sleeve Ring (TSR) connectors, TOSLINK optical connectors, VGA connectors, RCA, S-VIDEO, DVI, HDMI, DisplayPort, IEEE 1394, eSATA, RJ11 connectors, other audio, video, display or phone connector, or combinations of these. In one example, the connectors, such as connector A 224 and Connector B 226, implement wired connectivity between the docking-charging station 102 and the external devices connected to the docking-charging station 102, such as those described above with regards to FIG. 1 that include the monitor 110, speakers 116, the keyboard 112, the mouse 114, the remote server 120 or other computer, and the printer/scanner 122.

The processor 202 in one example performs processing to establish and maintain connectivity between a mobile device 104 and external devices connected to the docking-charging station 250 through the connectors, such as Connector A 224 and Connector B 226. In one example, processor 202 establishes and maintains the above described docking station wireless connection 132 through a connectivity unit such as Radio A 220 or Radio B 222, and operates to support data communicate between the mobile device 104 via the docking station wireless connection 132 and devices connected to the connectors, such as Connector A 224 and Connector B 226. Performing processing to establish and maintain data connectivity between a mobile device 104 and devices connected to connectors of the docking-charging station 250 is an example of performing wireless docking functions for the mobile device 104 such that there is no wired connectivity between the mobile device 104 and the docking-charging station 102.

Furthermore, the processor 202 of the docking-charging station 250 is able to receive or generate a processing assignment from the mobile device 104 or other processing external device, as is described in detail below. In one example, the mobile device 104 is able to offload processing functions to the docking-charging station 102 so that electrical consumption by a processor of the mobile device 104 is reduced and the mobile device is able to charge its power pack, such as a battery, more rapidly. Processing tasks offloaded to the docking-charging station 250 are able to be performed by the processor 202 of the docking-charging station 250, another processor accessible to the docking station 102 such as is present in the server 120, another processor, or combinations of these processors. In another example, the processor 202, an external device connected to docking-charging station 102, or both, is able to send a request to the mobile device 104 for the mobile device 104 to perform a particular processing task. In one example, the request to the mobile device 104 is able to specify that the particular processing task is to be performed under circumstances in which the mobile device 104 is receiving wirelessly transferred power for charging or to operate the circuits of the mobile device 104. Further examples of assigning processing tasks from either the mobile device 104 to the docking-charging station 102, or vice versa, are also able to be performed.

Figure 3:
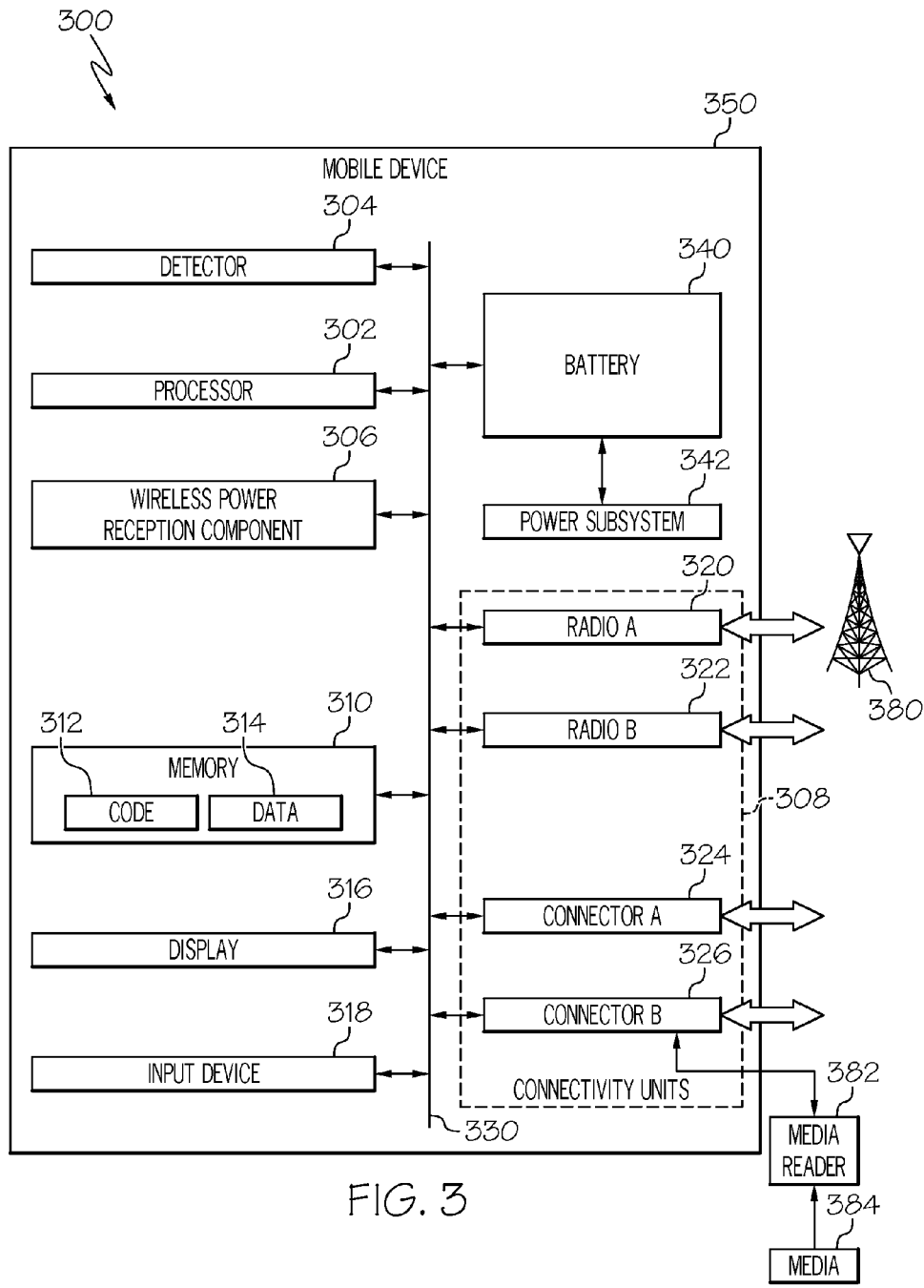
FIG. 3 illustrates a mobile device block diagram, according to an example.

FIG. 3 illustrates a mobile device block diagram 300, according to an example. The mobile device block diagram 300 depicts components of an example of a mobile device 104, such as is described above with regards to FIG. 1. The description of the mobile device station block diagram 300 describes interactions between components associated with or within the mobile device 104 and other external devices that are described above in reference to FIG. 1. It is to be further understood that various components described below with regards to the mobile device 350 are also able to be incorporated in further examples of a docking-charging station 250 as is described above with regards to FIG. 2.

The mobile device block diagram 300 depicts a communications bus 330 that supports the communication of data, other information, electrical power, and other elements, between or among the various components depicted in the mobile device block diagram 300. The communications bus 330 is able to consist of a single data communications architecture or bus, or the communications bus 330 is able to include multiple data, power, or data and power communications or conveyance structures that are within or attached to the docking-charging station 250.

The mobile device block diagram 300 depicts a processor 302 that performs various processing to support operations of the mobile device 350. The processor 302 communicates program code 312 and data 314 with memory 310 over the communications bus 330. The processor 302 executes the received program code 312 and uses the received data 314 as appropriate to perform the processes described herein. Program code 312 in one example is able to be stored in flash memory that is part of memory 310 in one example. Further examples are able to use a battery backed-up RAM or other non-volatile storage data elements to store program code 312, other executable programs, or both. The program code, device application software, or parts thereof, are also able to be temporarily loaded into volatile data storage such as RAM. Data received via wireless communication signals or through wired communications are also able to be stored one or more areas of memory 310.

The processor 302 interacts with one or more of the components depicted in the mobile device block diagram 300. For example, the processor 302 is able to interact with the depicted components by controlling, communicating data with, otherwise interacting with, or by combination of these. The processor 302, in addition to performing operating system functions, is able to execute software applications. A set of applications that control basic device operations, including at least data and voice communication applications, is able to be installed on the mobile device 350 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. The processor 302 is further able to perform part or all of the processing described in this specification.

The mobile device 350 is able to include one or more power storage or supply components, such as a battery 340 to provide power to the circuits of the mobile device 350. The one or more power storage or supply elements, such as a battery 340, are connected to a power subsystem 342 that provides power to the circuits of the mobile device 350. The power subsystem 342 includes power distribution circuitry for providing power to the various circuits and also contains in one example battery charging circuitry to manage recharging the battery 340 (or circuitry to replenish power to another power storage element). The power subsystem 342 in one example receives electrical power from the wireless power reception component 306. The power subsystem 342 in one example is also able to be connected to an external power supply (not shown) through an external power connector, such as through the below described Connector A 324, Connector B 326, other connectors (not shown) or any combination of these.

Depending on conditions or statuses of components within the mobile device 350, one or more particular functions associated with various subsystem circuits are able to be disabled, or an entire subsystem circuit may be disabled. For example, if the battery temperature is low, then voice functions may be disabled, but data communications, such as e-mail, may still be enabled over the communication subsystem.

A wireless power reception component 306 wirelessly receives power from an external source, such as the above described charging-docking station 102, and in some examples further contains battery charging circuitry to manage recharging the battery 340 (or circuitry to replenish power to another power storage element). In further examples, the wireless power reception component 306 operates with the power subsystem 342 to control recharging the batter 340 or other energy storage devices.

The mobile device 350 includes a detector 304 to detect the sense proximity of the mobile device 350 to a docking-charging station 102. The detector 304 is an example of a proximity detector that generates a proximity detection signal to alert the processor 302 to indicate the detected presence of the docking-charging station and, in some examples, an indication of an estimate of the distance between the docking-charging station 102 and the mobile device 350. In response to either detecting presence of a charging-docking station 102 or receiving wireless power via wireless power reception component 306, processor 302 of the mobile device 350 uses connectivity units 308, described below, to communicate with the docking-charging station 102. This communication may include transfer of information indicating the amount of power to provide to the mobile device 350 for operations such as charging its battery 340, powering components of the mobile device 350, other uses, or combinations of these.

The mobile device 350 includes connectivity units 308. Connectivity units 308 include wireless connectivity units, such as Radio A 320 and Radio B 322. Connectivity units 308 further include physical connectors, such as connector A 324 and connector B 326. Connector A 224 and connector B 226 in various examples support wired data communications, voice communications, video communications other types of communications, or combinations of these. Physical connectors in various examples conform to wired communications standards such as connectors defined by the USB standard, TSR connectors, HDMI connectors, other audio, video, display or phone connectors, or combinations of these.

The connectivity units 308 in this example support data communications, voice communications, video communications, other communications, or combinations of these over various standards, such as Bluetooth, WiFi as defined by various subsection of the IEEE 802.11 standard, WiGig, NFC, cellular networks such as GSM, GPRS, EDGE, CDMA, UMTS, LTE, LTE-A, and the like, other types of wireless communications, or combinations of these.

In one example, the mobile device 350 is a wireless two-way communication device with voice and data communication capabilities. Such electronic devices communicate with a wireless voice or data network 380 using a suitable wireless communications protocol. Wireless voice communications are performed using either an analog or digital wireless communication channel. Data communications allow the mobile device to communicate with other computer systems via the Internet. Examples of electronic devices that are able to incorporate the systems and methods described herein include, for example, a data messaging device, a two-way pager, a cellular telephone with data messaging capabilities, a wireless Internet appliance or a data communication device that may or may not include telephony capabilities.

The illustrated mobile device 350 is an example electronic device that includes two-way wireless communications functions. Radio A 320 in one example is a cellular radio connectivity component that operates to perform wireless communications operations to implement communications of voice, data, or both, over one or more cellular networks. The connectivity units 308 in one example include a digital signal processor (DSP) element that performs processing to extract data from received wireless signals and to generate signals to be transmitted. The particular design of the connectivity units 308 is dependent upon the communication network and associated wireless communications protocols with which the device is intended to operate.

The connectivity units 308 in one example further includes short-range connectivity components. In one example, Radio B 322 is a short range wireless data communications device that provides data connectivity between the mobile device 350 and different systems or devices, which are not necessarily similar devices. For example, Radio B 322 is able to support Bluetooth® communications to provide for connectivity with similarly-enabled systems and devices, including the data file transfer communications, other short range communications devices, or combinations of these. In further examples, the connectivity units 308 are able to include an infrared device and associated circuits (not shown) to perform infrared connectivity with external devices or the docking-charging station 102.

Communications between the docking-charging station 102 and the mobile device 350 is able to include data describing one or more connectivity assignments. As described above, a connectivity assignment defines the connectivity between the mobile device 350 and some or all of the external devices connected to the docking-charging station 102. In one example, the connectivity assignment defines connectivity to one or more external devices connected to the docking-charging station 102 as being one of either a direct wireless connectivity or connectivity through the docking-charging station 102.

Furthermore, communications between the docking-charging station 102 and the mobile device 350 are able to specify processing tasks that are to be offloaded from or onloaded to the mobile device 350. For example, the mobile device 350 is able to offload processing tasks by communicating processing functions to the docking-charging station 102 that are to be executed by a processor of the docking-charging station 102 or another processor to which the docking-charging station has access, such as the server 120. Offloading of processing tasks enables, for example, reducing the electrical consumption of the mobile device 350 to allow faster battery charging, reduction in heat generation, other effects, or combinations of these. Conversely, the mobile device 350 can onload processing from the docking-charging station 102 or from another external device through the docking-charging station 102. In this case, the processing power of the mobile device 350 can be used under circumstances in which additional processing capacity is desired. Results of the processing in one example are communicated back to the requesting external device.

The mobile device 350 includes a display unit 316 and input device 318 to provide a user interface. In some examples, processor 302 performs processing to present a depiction on the display unit 316 of the present connectivity assignment that define the connectivity between the mobile device 350 and the external devices connected to the docking-charging station 102. The input device 318 can be used in conjunction with such as display to modify these connectivity assignments so as to redefine the connectivity between the mobile device 350 and the external devices connected to the docking-charging station 102.

Connectivity through the connectivity units 308, such as through Radio A 322 or Connector A 324, enables a user to set preferences through an external device connected to the mobile device and also enables information or software communication through direct connectivity between the mobile device 350 and external data sources rather than via a wireless data communication network. In addition to data communication, the physical connectors are further able to provide power to the power subsystem 342 to charge the battery 340 or to supply power to the electronic circuits of the mobile device 350.

In a data communication mode, a received signal such as a text message or web page download is processed by the connectivity units 308, and communicated data is provided to the processor 302, which is able to further process the received data for output to the display unit 316, or alternatively, to a connector such as Connector A 324 or Connector B 326. A user of the mobile device 350 may also compose data items, such as e-mail messages, using the input device 318, which is able to include a complete alphanumeric keyboard or a telephone-type keypad, in conjunction with the display unit 316 and possibly a connector. Such composed items are then able to be transmitted over a communication network through the connectivity units 308.

For voice communications, overall operation of the mobile device 350 is substantially similar, except that received signals are generally provided to a speaker (not shown) and signals for transmission are generally produced by a microphone (not shown). Alternative voice or audio I/O subsystems, such as a voice message recording subsystem, may also be implemented.

A media reader 382 is able to be connected to a connector, such as one of connector A 324 or connector B 326, to allow, for example, loading computer readable program code of a computer program product into the mobile device 350 for storage into memory 310. In a further example, the media reader 382 is able to be incorporated into the mobile device 350. One example of a media reader 382 is an optical drive such as a CD/DVD drive, which may be used to store data to and read data from a computer readable medium or storage product such as computer readable storage media 384. Examples of suitable computer readable storage media 384 include optical storage media such as a CD or DVD, magnetic media, or any other suitable data storage device. Computer readable program code, such as application programs, configuration information, other data, or combinations of these, is alternatively able to be provided to the mobile device 350 through the data network 380.

Figure 4:
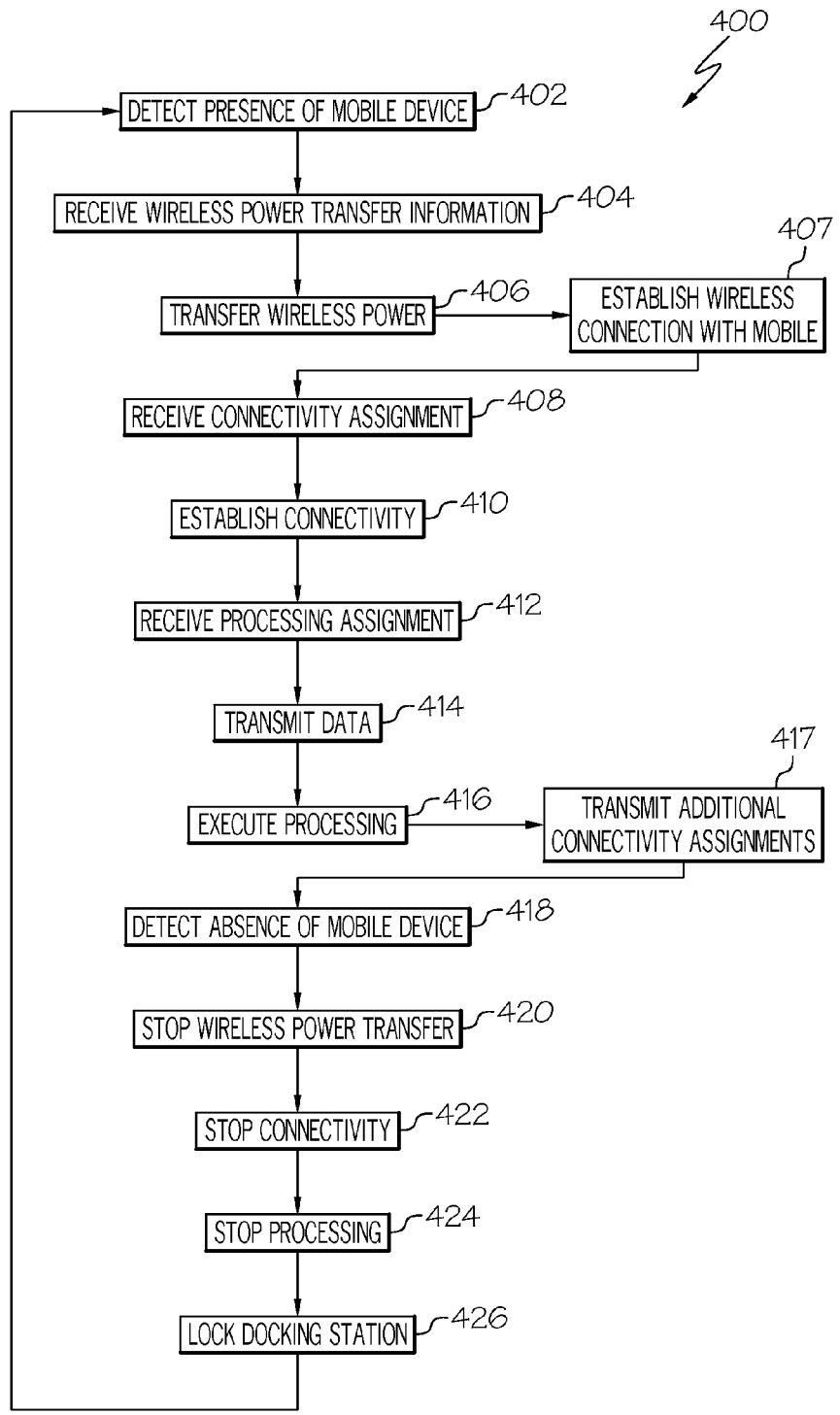
FIG. 4 illustrates a docking-charging station processing flow, according to an example.

FIG. 4 illustrates a docking-charging station processing flow 400, according to an example. The docking-charging station processing flow 400 is an example of processing performed by the processor 202 of the docking-charging station 250 described above, which is an example of the docking-charging station 102. The docking-charging station processing flow 400 begins by detecting, at 402, a presence of a mobile device, such as the mobile device 104 described above, in proximity to the docking station. Detecting the mobile device 104 is able to be performed by any suitable technique, such as detecting an establishment of a wireless data connectivity, such as a Bluetooth connectivity, between the docking-charging station 102 and the mobile device 104. The docking-charging station 102 is also able, in another example, to detect the presences of a mobile device 104 by detecting a wireless transfer of power from the charging component 208 of the docking-charging station 250 to the mobile device 104.

The docking-charging station processing flow 400 continues in one example by receiving, at 404, wireless power transfer information. In one example, the mobile device 104 is able to send wireless power transfer information to the docking-charging station via a wireless connectivity, such as via Bluetooth connectivity. The wireless power transfer information in one example includes wireless power transfer specifications upon which wireless power transfer is able to be based. The wireless power transfer information in another example is stored as data 214 in the memory 210 of the docking-charging station 250 prior to detecting the mobile device 104. In one example, the stored data containing the wireless power transfer information is a profile for a mobile device or user, as is described in further detail below. In such an example, receipt of the wireless power transfer information includes retrieving data 214 that contains that information. Wireless power transfer information in one example is also contained in a configuration definition data set that is able to be received by a docking station, such as the docking-charging station 102. In further examples, the wireless power transfer information is able to be received through other techniques or through combinations of some of these or other techniques. In one example, the wireless power transfer information in any format, such as in the form of a profile for a device or user, is able to be received from the server 120 described above or from another data source that is remote from the docking-charging station 102. The wireless power transfer information in one example specifies a rate at which wireless power is to be transferred to the mobile device 104 and is also able to convey other information related to providing power to the mobile device 104 to be used for charging a power pack of the mobile device, operating components of the mobile device, to be used for other things, or combinations of these. The wireless power transfer information in various examples is able to be either static, or dynamic. For example, dynamic wireless power transfer information is able to be changed by, e.g., providing new wireless power transfer information at any time such that the wireless power transfer information specifies changing power transfer values based upon the wireless power receiving requirements of the mobile device 104 then in effect.

The docking-charging station processing flow 400 continues by transferring, at 406, wireless power from the docking station to the mobile device 104. The transfer of wireless power in one example is based on, or in response to, detecting the presence of the mobile device in proximity to the docking station. The transfer of wireless power in one example is able to be based on the received wireless power transfer information. In one example, the wireless power transfer information is able to be included in a profile for a device or user. In further examples, a docking-charging station is able to transfer power to the mobile device without receiving wireless power transfer information based on, for example, default power transfer parameters or generalized parameters for different types of mobile devices. In one example, wireless power transfer is established based upon establishing the docking station wireless connection.

A wireless connection between the mobile device and the docking station to support wireless communication is established, at 407. The above described docking station wireless connection 132 is an example of a wireless connection that is established between the mobile device and the docking station. As discussed above, the described "establishing" of a connectivity, such as establishing the docking station wireless connection 132 or other connectivity, is intended to include actions such as activating, enabling, securing, or initiating the connectivity, and to also include also actions that include furnishing, supplying, making available, or maintaining the connectivity once the connectivity is activated, enabled, secured, or initiated. In one example, the wireless connection between the mobile device and the docking station to support wireless communication is established simultaneously with the transferring of wireless power from the docking station to the mobile device.

The docking-charging station processing flow 400 receives, at 408, connectivity assignment information. Connectivity assignment information is able to be received from one or more of many sources. For example, connectivity assignment information is able to be stored as data 214 in the memory 210 of the docking-charging station 250. Alternatively, or additionally, in one example connectivity assignment information is able to be stored on and received wirelessly from the mobile device 104 or another external device, such as server 120 described above. In an example, the connectivity information is contained within profile data for a device or user, as is described below. The connectivity information may be static or dynamic. In the case of dynamic information, connectivity assignments are able to be changed by new connectivity information being received at any time that defines new connectivity configurations that are to be established. In an example of static connectivity assignment information, the connectivity information may be set by a user with the user interface of the docking-charging station 102, the mobile device 104, another external device, or combinations of these. Examples of dynamic connectivity information include dynamic connectivity generation by the docking-charging station 102, the mobile device 104, another external device, or combinations of these, based upon, for example, the charging urgency of the mobile device 104, the quality of connectivity under current noise conditions, availability of the connectivity, target data transfer speed, other consideration, or combinations of these.

Connectivity is established, at 410, according to the received connectivity assignment information. In one example, the established connectivity is at least one of wired connectivity and wireless connectivity through the docking station between the mobile device and one or more external devices based on the connectivity assignment. In the illustrated example, at least some of the established connectivity consists of data communication paths that include the docking station wireless connection 132. The presently configured connectivity between a mobile device and, for example, the docking-charging station and one or more external devices, is referred to herein as the connectivity configuration. Connectivity configurations are able to include one or more wired and wireless connectivity between devices that are able to include the wireless docking station connection, direct connectivity, other connectivity, or combinations thereof.

Processing assignment information in one example is received, at 412. Processing assignment information in one example is stored as data 214 in the memory 210 of the docking-charging station 250 prior to detecting the presence of the mobile device 104. In another example, processing assignment information is received from the mobile device 104 or from another external device. In some examples, processing assignment information is received from combinations of two or more sources.

The processing specified in the processing assignment information is able to include one or both of onload processing that defines tasks to be performed by a processor of the mobile device, and offload processing that defines tasks to be performed by processors associated with the docking-charging station 250. These processing assignments may be static or dynamic. In an example of dynamic processing assignments, a processor of the mobile device 104 is able to send a series of processing assignment information for offload processing based on a state of charge of the power pack of the mobile device. In such an example, the offload processing is able to vary based on the state of charge of the power pack. For example, a mobile device with a battery having a low state of charge may specify more offload processing tasks so that less received power is used to power the processor of the mobile device 104 and more power is able to be used to recharge the battery of the mobile device 104. As the battery reaches a higher level of charge, the offload processing tasks may be reduced by, for example, the mobile device 104 sending new processing assignments to the docking-charging station 102. In another example of dynamic processing assignments, the docking-charging station 102, or processors in communications with the docking charging station 102, are able to define processing a sequence of processing assignments that specify different amounts of onload processing tasks in order to accommodate periods of high processing demands by utilizing the processor within the mobile device 104. The tasks defined by the processing assignment information are then executed, at 414.

The docking-charging station processing flow 400 in some examples transmits or communicates data, at 414, with the mobile device 104. Communicating data is able to include one or both of transferring data from the docking-charging station 102 to the mobile device 104, and transferring data from the mobile device 104 to the docking-charging station 102. In the case of transferring data from the docking-charging station 102 to mobile device 104, the transferred information is able to be obtained from one or more of data that is stored locally by the docking-charging station 102 or the data is able to be received from another external device, such as from the server 120 described above with regards to FIG. 1. This communication of information is able to be part of a process of synchronizing or "syncing" information on the mobile device 104 with that stored on another device, such as server 120. Synchronizing information between the mobile device 104 and other external devices allows a user to access a consistent set of information whether the user is using the mobile device 104 or the remote from which the data originated. Synchronizing data between a mobile device 104 and another computer is also able to provide a back-up of information, such as emails, messages, and the like, in case of loss or destruction of the mobile device 104 or the originating computer.

The docking-charging station processing flow 400 continues by executing, at 416, the processing defined by the processing assignments that were received, such as described above with regards to receive processing assignment 412. Processing tasks that were offloaded to the docking-charging station 102 are executed at this point in one example. Executing the offloaded processing is able to be based on processing assignment information stored in the docking-charging station 102, based on information received from the mobile device 104, based on information received from another external device such as a server, or combinations of these. The processing assignments may be static or dynamic. In the latter case, processing assignments are able to be made by the mobile device 104 are able to change over time based on the urgency for charging its battery, or in cases in which the charging-docking station 102 or another external device such as the remote server 120, is using the processing power of the mobile device 104 while it is being charged by charging-docking station 102.

In one example, additional connectivity assignments are transmitted, at 417, from the docking station to the mobile device. The additional connectivity assignments specify, for example, additional wireless connectivity between the mobile device and the one or more external devices.

In one example, the docking charging station detects, at 418, an absence of the mobile device 104. The absence of the mobile device 104 is able to be caused by, for example, a user removing the mobile device 104 from the vicinity of the docking-charging station 102 and carrying the device away. The absence of the mobile device 104 is able to be detected by, for example, one or more of detecting a loss of wireless or wired data communications between the docking-charging station 102 and the mobile device 104, detecting a large reduction in the wireless transfer of power between the docking-charging station 102 and the mobile device 104, or other techniques. As is further discussed in detail below, an absence of the mobile device within a particular range of the docking station is also able to be detected. The particular range is able to correspond to, for example, a maximum range for effective wireless power transfer, or an effective operating range of a wireless high speed data connection between the mobile device and the docking station.

The wireless transfer of power is stopped or halted, at 420. Stopping the transferring of wireless power to the mobile device by the docking station in one example is based on detecting the absence of the mobile device within a particular range of the docking station, as discussed above. Connectivity between the docking-charging station 102 and the mobile device 104 is stopped or halted, at 422. In one example, halting connectivity includes stopping the connectivity that was established through the docking-charging station 102 that supports communications between the mobile device 104 and external devices connected to the docking-charging station 102. In one example, the connectivity assignments established above, at 410, include connecting, through the docking-charging station 102, the keyboard 112 and mouse 114 to be used as input devices for the mobile device 104. Halting connectivity in one example disconnects the connectivity between the devices. The processing performed by the docking-charging station 102, or performed by processors associated with the docking-charging station 102 such as in server 120, is also stopped or halted, at 424. This processing is halted in one example based upon the detection of the absence of the mobile device 104, as detected above at 418.

In one example, the docking-charging station processing flow 400 continues by locking, at 426, the docking-charging station 102 to the particular mobile device that was connected to the docking-charging station 102. In locking the docking-charging station to a particular mobile device, the docking-charging station 102 becomes unavailable to other mobile devices to establish a docking station wireless connection 132. In one example, the docking-charging station is locked to the mobile device under circumstances in which the docking station wireless connection 132 is established. In further examples, the docking-charging station is locked to the mobile device under circumstances in which the docking station wireless connection is disconnected. In some examples, the docking-charging station is not locked to the mobile device.

FIG. 5 illustrates a docking station connectivity processing flow 500, according to an example. In one example, the docking station connectivity processing flow 500 is performed by the processor 202 of the docking-charging station 250 described above, which is an example of the docking-charging station 102, and provides connectivity between the mobile device 104 and external devices attached to the docking-charging station 102 under circumstances in which the mobile device 104 is docked to the docking-charging station 102. A mobile device 104 in one example is considered to be docked to a docking-charging station 102 under circumstances in which the mobile device is detected to be in the vicinity of the docking-charging station 102. As described below, some examples provide an ability to detect the presence of a mobile device 104 in the vicinity of a docking-charging station 102 by detecting, for example, the transfer of power from the docking-charging station 102 to a mobile device 104, the establishment of a wireless or wired data connectivity between the docking-charging station 102 and the mobile device, other techniques, or combinations of these.

The docking station connectivity processing flow 500 begins in one example by receiving, at 502, identification information for a specific mobile device 104 that is detected to be in proximity to the docking-charging station 102. The identification information in one example is any form of data that serves to identify the particular mobile device 104 that is in proximity to the docking-charging station 102. In some examples, various configuration information data is stored in association with the identification information for each mobile device. Upon receiving the identification information, a docking-charging station 102 is able to retrieve the configuration information and configure various components, connectivity, elements, or combinations of these, according and that configuration information. The identification information in one example is received from the mobile device 104. The identification information is also able to be provided to the docking-charging station 102 by other sources such as the server 120 described above with regards to FIG. 1, from another source, or combinations of these.

The docking-charging station 102 receives, at 504, connectivity configuration information indicating the connectivity that the docking-charging station 102 is to provide for the mobile device 104 that is detected in proximity to the docking-charging station 102. The connectivity configuration information is able to be received from the mobile device 104 itself, from another external device with access to the docking-charging station 102 such as server 120, other sources, or combinations of these.

The received connectivity configuration information is stored, at 506, in one example in association with the identification information received, at 502, for the mobile device. In one example, the received identification information and the received connectivity configuration information are stored as data 214 in the memory 210 of the docking-charging station 250 so that this information is available for display to the user. Moreover, the stored information can be used to establish connectivity for the mobile device 104 at this time, in the future such as under circumstances in which the mobile device 104 is again docked to the docking-charging station 102, or both.

Connectivity between the mobile device 104 and the external devices connected to the docking-charging station 102 is then established, at 508, based on the received connectivity configuration information. In one example, the connectivity consists of direct connectivity between the mobile device 104 and the external devices, connectivity through the docking-charging station 102 that support communications between the mobile device 104 and the external devices connected to the docking-charging station 102, or both.

In one example, the docking station connectivity processing flow 500 operates such that the first time that a particular mobile device 104 is docked at particular docking-charging station 102, the mobile device 104 provides its identification information to the docking-charging station 102 along with a connectivity configuration. One or both of the identification information and connectivity configuration is able to be pre-set by a manufacturer of the mobile device 104, downloaded to one or both of the mobile device 104 and docking-charging station 102, set by the user using the mobile device 104 or the docking-charging station 102, or any combination of these. In one such example, the connectivity configuration for that particular mobile device 104 is available for use by the docking-charging station 102 under circumstances in which the mobile device 104 is recognized based on its identification information. The operation of this example allows a single docking-charging station 102 to rapidly establish wireless charging and connectivity for multiple mobile devices to accommodate, for example, multiple users who may use the docking-charging station 102 at different times.

FIG. 6 illustrates a connectivity display processing flow 600, according to one example. The connectivity display processing flow 600 is performed by the processor 202 of the docking-charging station 250 in one example. The connectivity display processing flow 600 begins with receipt, at 602, of a request to display connectivity information. This request is able to be received, for example, based upon a request from a user via a user interface element of either or both of the docking-charging station 102 or the mobile device 104. Alternately, the request may originate from an administrator via another external device, such as a network administration computer or server 120.

The connectivity information is retrieved, at 604. The connectivity information is able to be retrieved from the memory 210 of the docking-charging station 250, received from the mobile device 104, received from another external device, or from combinations of these. The received connectivity information in one example includes definitions of the presently active connectivity that are operating to support communication between the mobile device and external devices. The connectivity information received in one example further includes descriptions of available connectivity that may not be presently active, but is able to be activated to provide connectivity between the mobile device and a particular external device.

A display indicating the connectivity of external devices to the docking-charging station 102, to the mobile device 104, or to both, is then generated, at 606, in response to the received request and received connectivity information. In one example, the generated display is a presentation that indicates a present connectivity configuration of the at least one of wired connectivity and wireless connectivity. In one example, the generated display further indicates a connection status of each indicated connectivity. A connection status in one example has a value of either "active," or "inactive." A connectivity with an active connection status is operating to communicate data between the mobile device and an external device. A connectivity with an inactive connection status is not presently operating to communicate data, but is able and available to do so if its connection status is changed to active.

Once a display is generated, a determination is made, at 608, if an indication of a change to a connection status of the one or more wired or wireless connections is received. An indication to change a particular connectivity from an active state to an inactive state, or from an inactive state to an active state, is an example of an indication of a change of connection status. An indication of a change of connection status is able to be received through a user interface, from an external device, from another source, or from combinations of these.

Based on, or in response to, receipt of an indication of a change to a connection status, at 608, the one or more wired or wireless connections of the docking station or mobile device is modified based on the indication of the change in connection status, at 610. This modification is able to include, for example, changing a connection status of a particular connectivity from an active state to an inactive state, or from an inactive state to an active state, in accordance with the received indication. Following modification at 610, the display of the connectivity configuration may be updated at 606 to reflect the modification to the connectivity configuration or connection status.

FIG. 7 illustrates an external device connectivity display 700, according to an example. The external device connectivity user display 700 depicts and indicates external devices with which the mobile device 104 is able to communicate data. The external device connectivity display 700 is able to be presented on any suitable display, such as the above described display unit 216 of the docking-charging station 250, or the display unit 316 of the mobile device 350. In an example, the external device connectivity display 700 is presented as part of the connectivity display processing flow 600, described above. Alternatively, the docking-charging station 102 or the mobile device 104 is able to generate and present the external device connectivity display 700 by interacting with various external devices, such as the monitor 110, keyboard 112, mouse 114, or combinations of these. In another example, the external device connectivity display 700 is able to be rendered on the display unit 316 of a mobile device 350 based upon information received from the docking-charging station 102 through a docking station wireless connection 132.

The external device connectivity display 700 depicts the connectivity configuration between the mobile device 104 and various external devices. In one example, the presented connectivity configuration refers to data communications between devices, such as between the mobile device 104 and various external devices as are described with regards to FIG. 1. The illustrated external device connectivity display 700 depicts two types of connectivity between the mobile device 104 and the various external devices. One type of connectivity is referred to as docking station connection routes. A docking station connection route in this context is data communication connectivity between the mobile device 104 and a particular external device that includes a docking station wireless connection that is established between the mobile device 104 and the docking station 102. In one example, a docking station connection route is established under circumstances in which the mobile device 104 is connected to a docking-charging station 102 through a docking station wireless connection 132, and the docking-charging station has another data connectivity with that particular external device. The other type of connectivity is referred to as a direct wireless connectivity. A direct wireless connectivity in this context refers to a data connectivity that is established from the mobile device 104 to the particular external device that does not include connectivity through the docking-charging station 102. In some examples, docking station connection routes, direct wireless connectivity, or both, are able to include connectivity that are routed through one or more other devices, such as network routers or other connectivity nodes, and are not necessarily limited to a single data communication channel between the mobile device 104 and the external device. For example, a direct wireless connectivity to a particular external device is able to consist of a Wi-Fi data connectivity that passes through a Wi-Fi router that is between the mobile device 104 and the particular external device.

The external device connectivity display 700 includes a docking-charging station table 702 and a mobile device table 704. A docking-charging station external device row 710 depicts a list of external devices, such as are described above with regards to FIG. 1, that are accessible to the docking-charging station 102 and to which a mobile device is able to establish a docking station connection route that includes the docking station wireless connection that is established between the mobile device 104 and the docking station 102. The illustrated example depicts external devices including DISPLAY, which corresponds to monitor 110, SPEAKERS, which correspond to speakers 116, Keyboard, which corresponds to keyboard 112, MOUSE, which corresponds to mouse 114, NETWORK SERVER, which corresponds to server 120, and PRINTER-SCANNER, which corresponds to printer/scanner 122. A MEDIA PLAYER is also listed. Examples of external devices listed in the docking-charging station external device row 710 are external devices that are connected to support data communications with the docking-charging station through wired or wireless data connectivity. In the illustrated example, the docking-charging station external device row 710 depicts each external device that is identified through a respective docking station connection route that includes the docking station wireless connection.

The mobile device external device row 720 in this example depicts a similar list of external devices as is shown for the docking-charging station external device row 710. The mobile device external device row 720 depicts external devices that are accessible to the mobile device 104 through, for example, a direct wireless connectivity that does not include connectivity through the docking-charging station 102. In the depicted example, the same set of external devices is accessible to the docking-charging station 102 and the mobile device 104. In further examples, different sets of external devices are accessible to the difference devices, such as a printer that is hardwired to the docking-charging station 102 such that it is not directly accessible to the mobile device. Alternatively, a device may have a wireless interface that is compatible with the mobile device 104 and not the docking-charging station 102, and therefore is only accessible to the mobile device through a direct wireless connectivity. In one example, the mobile device external device row 720 includes a depiction of external devices that are identified through respective connectivity that include a docking station wireless connection between the mobile device 104 and the docking station 102 even though those external devices have available connectivity through direct wireless connectivity.

A docking station connection route type row 712 depicts the type of each respective connectivity that is used to connect each external device to the docking-charging station 102. In the illustrated example, the "DISPLAY" is indicated as connected to the docking-charging station through a WiGig connectivity, the KEYBOARD is indicated as connected through a Bluetooth connectivity, and so forth. A docking-charging station connection status row 714 depicts the status of each docking station connection route, as either being "ON" or "O." A docking-charging station connection route strength row 716 depicts the signal strength of each docking station connection route whether the connection is wired or wireless. The signal strength is indicated in this example on a scale of zero (0) through five (5). Signal strength is illustrated in this example as a numerical value. Further examples are able to graphically represent signal strength such as by bar graphs or other techniques. Additionally, other docking station connection route information is able to be depicted in a similar external device connectivity display 700.

A mobile device direct connectivity type row 722 depicts the type of each respective direct connectivity that is used to directly connect each external device to the mobile device 104. In the illustrated example, the "SPEAKERS" are indicated as connected to the mobile device 104 through Bluetooth connectivity, the "MEDIA PLAYER" is indicated as connected through WiFi connectivity, and so forth. A mobile device direct connectivity status row 724 depicts the status of each direct connectivity as either being "on" or "off." A mobile device direct connectivity signal strength row 726 depicts the signal strength of each direct wireless connectivity that is active, on a scale of zero (0) through five (5). In further examples, other mobile device direct connectivity information is able to be depicted by the device connectivity user interface display 700.

The docking-charging station connectivity status row 714 and the mobile device connectivity status row 724 depict which connectivity is active. In this context, an active connectivity for a particular external device refers to the connectivity that is currently in use to communicate between the mobile device 104 and that particular external device. A connectivity that is indicated as "on" in the docking-charging station connectivity status row 714 for a particular external device indicates that the docking station connection route that includes the docking station wireless connection is the active connectivity for that external device. A connectivity that is indicated as "on" in the mobile device connectivity status row 724 for a particular external device indicates that the direct wireless connectivity associated with that particular external device is the active connectivity for that external device. In general connectivity, such as a docking station connection route or a direct wireless connectivity, that connects two devices is referred to as being associated with one or both of those devices. In the context of the external device connectivity display 700, connectivity is said to be associated with the external device that the connectivity connects to the docking-charging station or the mobile device.

The external device connectivity display 700 is also able to support reconfiguration of connectivity, such as changing data connectivity between a mobile device 104 to an external device such as a printer, from docking station connection route that includes a docking station wireless connection to a direct wireless connectivity that directly connects the mobile device 104 to the external device without including a connection to the docking-charging station 102. In one example, a cursor 730 is able to be moved on a Graphical User Interface (GUI) depicting the external device connectivity display 700 in order to receive user inputs to select displayed elements and to receive user inputs to select a particular connectivity. By moving the cursor 730, such as by moving a mouse 114 or by providing an input on a touchscreen of a display, such as the display unit 216 of the docking-charging station 250 or the display unit 316 of the mobile device 350, a particular box in the docking station connection route strength row 716 or the mobile device docking station connection route strength row 726 is able to be selected and the status of the particular connectivity can be changed from "on" to "off." In another example, selecting a box in the docking station connection route row 712 or the mobile device docking station connection route row 722 causes a list of the different connectivity options to be displayed such that a user input is able to select a connectivity from the list. Alternatively, a box is able to be selected into which text is entered via an input device, such as a keyboard, to identify a specific connectivity. The above described user inputs in one example cause the generation of an indication to change the connection status of the one or more wired or wireless connections. The processing of one example operates to modify the one or more wired or wireless connections of the docking station or mobile device based on the indication of the change in connection status.

In one example, clicking on a box within one of the docking-charging station connectivity status row 714 indicates that the docking station connection route for the external device of the column of that box is a selected connectivity for that external device. Clicking on that box in one example causes the docking station connection route associated with that particular external device, i.e., the selected connectivity in this case, to be configured as the active connectivity for that external device. The indication in that box is changed to "on" to indicate that the docking station connection route is the active connectivity. In this example, the corresponding box in the mobile device connectivity status row 724 is deactivated and the indication is changed to "off." The operation of this example also allows the inverse, i.e., clicking on a box in the mobile device connectivity status row 724 causes the direct wireless connectivity to be the selected connectivity, whereby the indication in that box is set to "on" and the indication in the corresponding box of the docking-charging station connectivity status row 714 changes to "off."

The reconfiguration of connectivity is also able to operate upon an input, such as a user input, that indicates switching connectivity from a present connectivity, which is the presently active connectivity, to a selected connectivity that is different than the present connectivity. In an example of switching connectivity includes clicking on a box of the mobile device connectivity status row 724 that indicates "off." In this example, clicking on the box causes status of that connectivity to be changed to "on" and the corresponding indicator for that external device in the mobile device connectivity status row 724 is changed to "off," thereby disconnecting the present connectivity and connecting the selected connectivity.

Figure 8:
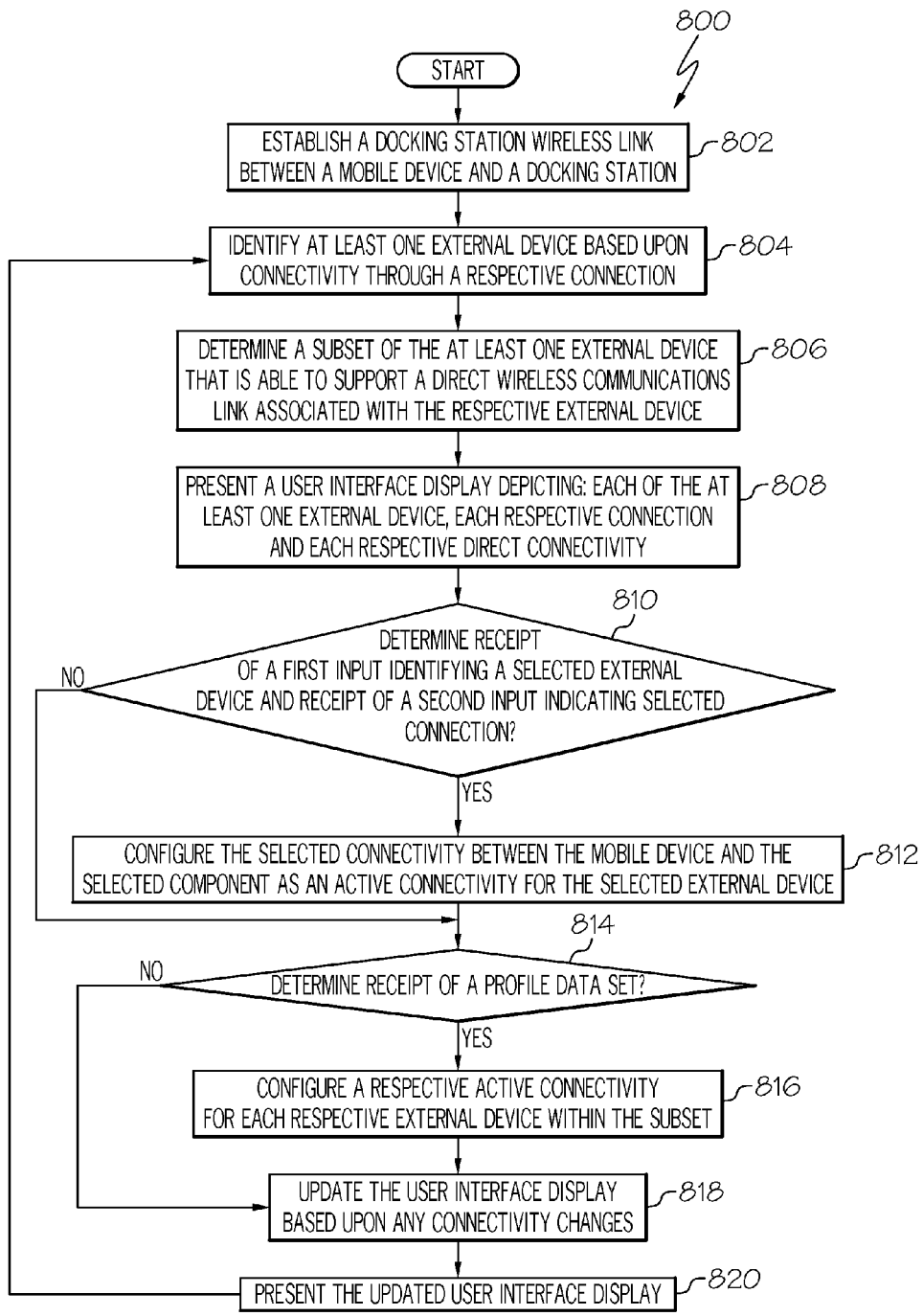
FIG. 8 illustrates a communications control and monitoring process, according to an example.

FIG. 8 illustrates a communications control and monitoring process 800, according to an example. The communications control and monitoring process 800 is able to be performed by, for example, a processor 202 of the docking-charging station 250, the processor 302 of the mobile device 350, another processor, or the process is able to be distributed between or among two or more of such processors. The communications control and monitoring process 800 begins by establishing, at 802, a docking station wireless connection between a mobile device, such as the mobile device 104, and a docking station, such as the docking-charging station 102.

The communications control and monitoring process 800 continues by identifying, at 804, at least one external device based upon connectivity through a respective docking station connection route. In one example, each respective external device of the at least one external device is communicatively coupled to the docking station and each respective docking station connection route is associated with a respective external device and includes the docking station wireless connection. In one example, the identifying is based upon a determination that connectivity that includes the docking station wireless connection 132 exists between the mobile device 104 and external devices that are connected to the docking-charging station 102.

The communications control and monitoring process 800 continues by determining, at 806, a subset of the at least one external device such that each external device within the subset is able to support a respective direct wireless connectivity associated with the respective external device and each external device in the subset is able to support communications between the mobile device and the respective external device. In one example, the subset is determined by identifying external devices to which the mobile device 104 is able to establish a direct wireless connectivity, such as the direct monitor wireless connectivity 134, the direct printer/scanner wireless connectivity 136, the direct speakers wireless connectivity 138, the direct keyboard wireless connectivity 152, and the direct mouse wireless connectivity 154 described above with regards to FIG. 1.

The communications control and monitoring process 800 continues by presenting, at 808, a user interface display depicting: each of the at least one external device, each respective docking station connection route between the mobile device and each external device, and each respective direct wireless connectivity between the mobile device and the each external device. Such a display is described above with regards to FIG. 7.

The communications control and monitoring process 800 continues by determining, at 810, receipt of a first input identifying, based upon the user interface display, a selected external device from within the subset and receipt of a second input indicating a selected connectivity comprising one of a respective direct wireless connectivity associated with the selected external device and a respective docking station connection route associated with the selected external device between the mobile device and the selected external device. An example of receipt of such a first input and a second input is described above with regards to FIG. 7, were a user selects, such as by clicking, a box in the mobile device connectivity status row 724. Based on a determination of such receipt, the communications control and monitoring process 800 configures, at 812, the selected connectivity between the mobile device, such as the mobile device 104, and the selected external device as an active connectivity for the selected external device.

The communications control and monitoring process 800 continues by determining, at 814, receipt of a profile data set, such as a configuration definition data set. In various examples, the configuration definition data set is able to be received at either the mobile device, the docking-charging station, at another location, or at several of these locations. Based upon the determination of receipt of a configuration definition data set, the communications control and monitoring process 800 of one example configures, at 816, for each respective external device within the subset, a respective active connectivity, the respective active connectivity being one of the respective docking station connection route associated with the each external device, and the respective direct wireless connectivity associated with the each external device.

The communications control and monitoring process 800 continues by updating, at 818, the user interface display based upon any connectivity changes. Connectivity changes are able to occur based upon receiving user inputs, receiving configuration definition data sets, due to any other event or reason, or combinations of these. The updated user interface display is then presented, at 820. The communications control and monitoring process 800 then returns to identifying, at 804, at least one external device in order to, for example, accommodate changes in connectivity between the mobile device and one or more external devices.

Figure 9:
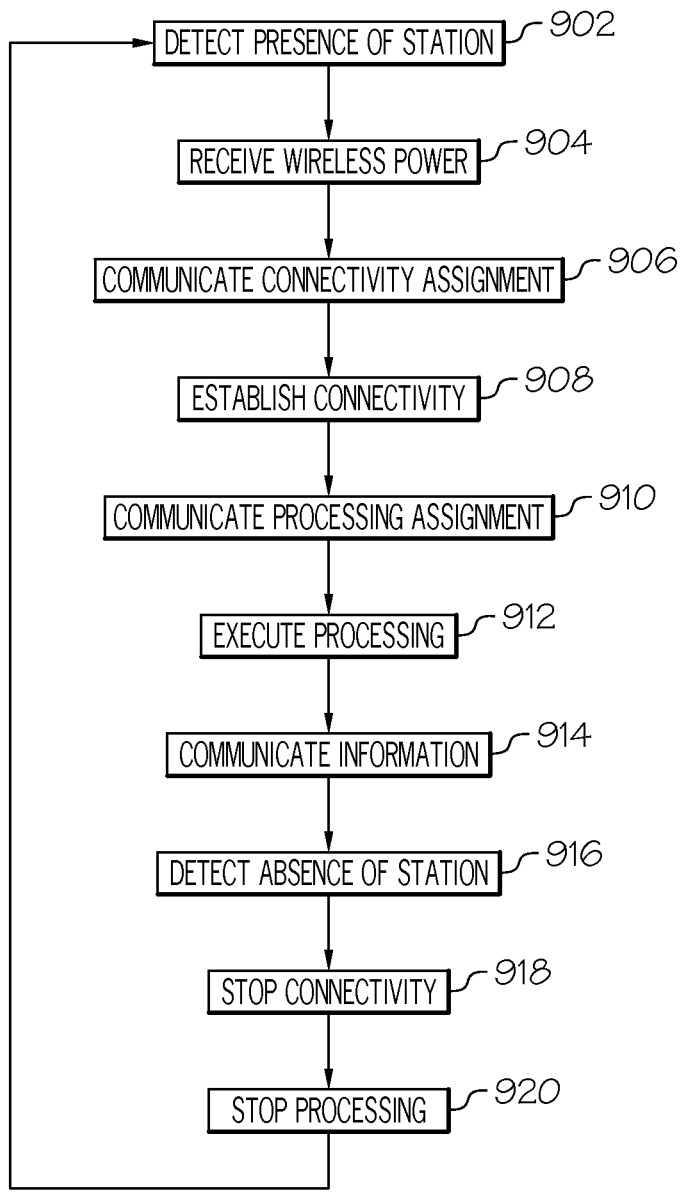
FIG. 9 illustrates a mobile device docking process, according to an example.

FIG. 9 illustrates a mobile device docking process 900, according to an example. The mobile device docking process 900 is performed in one example by the processor 302 of the mobile device 350. The mobile device docking process 900 begins by detecting, at 902, a presence of a docking-charging station 102 in proximity to the mobile device 104. In one example, a docking-charging station 102 is detected to be in proximity to the mobile device 104 based on the mobile device 104 being brought close to the docking-charging station 102. The mobile device 104 receives, at 904, wireless power from the docking-charging station 102.

The presence of the docking-charging station 102 in proximity to the mobile device 104 is able to be detected based upon various techniques. For example, one basis for detecting the that the docking-charging station is in proximity to the mobile device 104 is to detect that the mobile device 104 is wirelessly receiving power as occurs under circumstances in which the mobile device 104 is placed near, or on, the docking-charging station 102. The presence of the docking-charging station 102 in proximity to the mobile device 104 is also able to be detected by the establishment of a wireless or wired data connectivity between the mobile device 104 and the docking-charging station 102. Other techniques as well as combinations of these and other techniques are also able to be used to detect the presence of the docking-charging station 102 in proximity to the mobile device 104.

The mobile device 104 in this example communicates, at 906, connectivity assignment data with the docking-charging station 102 to enable the docking-charging station 102 of one example to establish connectivity on behalf of the mobile device 104. The docking-charging station 102 can use this connectivity configuration to set up indicated connectivity for the mobile device 104 while it is docked. communicating connectivity assignment data is able to include receiving connectivity configuration from the docking-charging station 102. Connectivity assignment data is able to be received under circumstances in which, for example, the docking-charging station 102 has stored the connectivity assignment data for the mobile device 104, under circumstances in which the docking-charging station 102 has received this data from another external device, such as server 120 such as in response to providing the identification of the mobile device to such other external device, under other conditions, or due to the occurrence of several conditions. Communicating connectivity assignment data is also able to include transmitting connectivity assignment data to the docking-charging station 102.

Connectivity is established, at 908, by the mobile device 104 for external devices to which the mobile device 104 is to establish direct connectivity, such as a direct wireless connectivity, according to the connectivity assignment data. The docking-charging station 102 generally performs some processing to establish connectivity between the mobile device 104 and external devices that are to be connected through the docking-charging station 102, while processing within the mobile device 104 is able to be performed to complete the connectivity between processing components of the mobile device 104 and external devices that are connected thereto through the docking-charging station 102.

Processing assignments are then communicated, at 910, between the mobile device 104 and the docking-charging station 102. As described above, the mobile device 104 is able to transfer processing assignments that onload processing tasks onto the processor 302 of the mobile device 350, that offload processing off of the processor 302 of the mobile device 350 by transmitting those tasks to a processor associated with the docking-charging station 102, or both. Offloading processing tasks is performed, for example, to shed processing and thereby battery consumption from the mobile device 104 to, for example, enable faster battery charging. Onloading processing tasks is performed, for example, in order to utilize the processing power of the mobile device 104 while it is wirelessly docked.

The mobile device docking process 900 continues by executing, at 912, any processing tasked assigned to the processor 302 of the mobile device 350, which may include functions transmitted to it by the docking-charging station 102, by processors associated with the docking-charging station 102, other processors, or combinations of these. The mobile device docking process 900 in some examples communicates information, at 914, with other external devices. Communicating information includes offloading information from the mobile device 104 to the docking-charging station 102 for storage locally on the docking-charging station 102 or for transmission to another external device, such as server 120, for storage, or both. Communicating information is also able to include onloading information from another source, such as the docking-charging station 102, another external device, or both. Onloaded information is able to originate from the memory of the docking-charging station 102, originate from another source accessible by the docking-charging station 102, such as the server 120, other sources, or combinations of these. communicating information is able to be part of syncing information that operates to communicate information updates between the mobile device 104 and the docking-charging station 102 or other information sources accessible thereto, such as the server 120, so that the same information is stored on and accessible to a user under circumstances in which using either or both of the mobile device 104 and the device with which information is communicated. Such operations permit the user to access the same up-to-date information whether the user accesses such information via the mobile device 104, server 120, another external device, or combinations of these.

The mobile device docking process 900 continues in one example to detect, at 916, and absence of the docking-charging station 102. This generally occurs, for example, in a circumstance in which the mobile device 104 has been moved out of range of the docking-charging station 102, the docking-charging station 102 has been turned off, or combinations of these. Connectivity with at least the docking-charging station 102 stops, at 918, based on the detected absence of the docking-charging station 102. Processing onloaded to the mobile device 104, such as processing received in processing assignments at 910, is also stopped, at 920, based on the detection of the absence of the docking-charging station 102.

Figure 10:
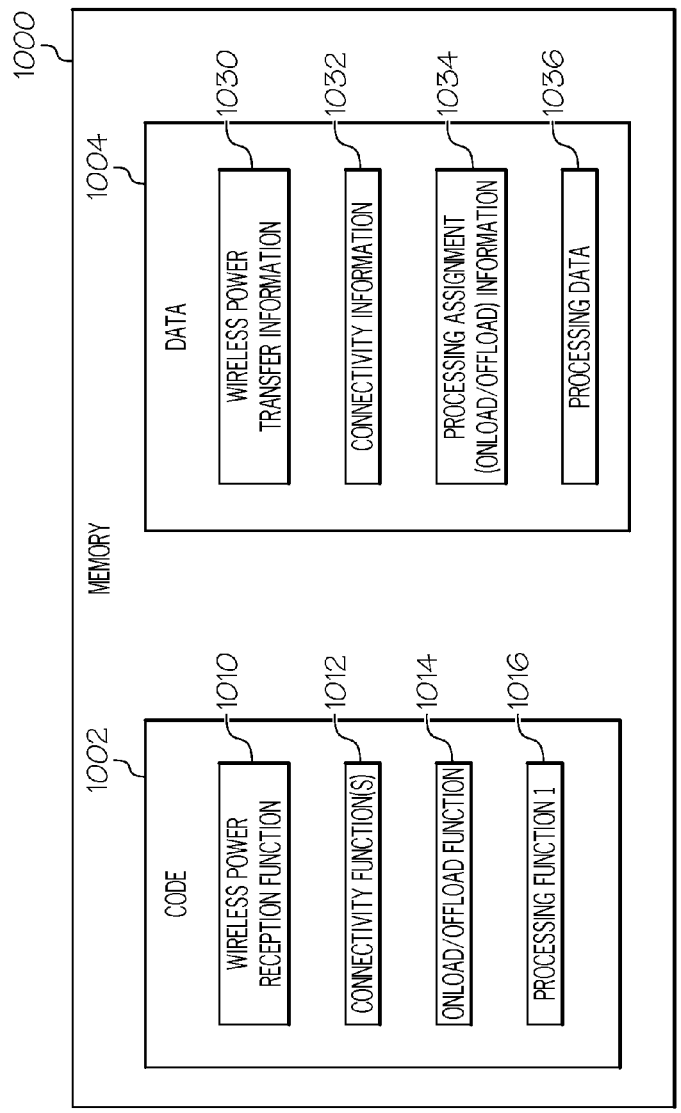
FIG. 10 illustrates mobile device memory content, according to an example.

FIG. 10 illustrates mobile device memory content 1000, according to an example. The mobile device memory content 1000 illustrates an example of the contents of a mobile device memory 310 as described above with regards to FIG. 3. The mobile device memory content 1000 includes code 1002 and data 1004 used by the processor of a mobile device 104, such as the processor 302 discussed above, to perform the processing described herein. The code 1002 includes a wireless power reception function 1010 that enables the mobile device 104 to receive wireless power transferred from the docking-charging station 102. The code 1002 also includes connectivity function(s) 1012 that enables the mobile device 104 to establish connectivity with other external devices, such as the external devices discussed above with regards to FIG. 1. The code 1002 further includes onload/offload function 1014 that enables the mobile device 104 to onload or offload processing functions. In addition, the onload/offload function 1014 may handle transfer of the result of processing to or from the mobile device 104 upon completion of execution of the function. In addition, the code 1002 further includes additional processing functions 1016 that are able to be executed by the mobile device's processor 302, or they may be offloaded to a processor within or associated with the docking-charging station 102, or combinations of these.

Data 1004 includes wireless power transfer information 1030 that the mobile device's processor 302 can transfer to the docking-charging station 102 to provide wireless power transfer parameters such as an amount of power to be transferred to the mobile device 104, the maximum power level or power transfer rate, other information, or combinations of these. Connectivity information 1032 includes the connectivity assignment data for the mobile device 104, the docking-charging station 102, or both. The connectivity information 1032 is also able to include protocol stack(s) used to establish connectivity. Processing assignment information 1034 indicates the entity responsible for handling of processing functions, which may include the mobile device 104, the docking-charging station 102, another external device, or combinations of these. Processing data 1036 is used by the mobile device's processor 302 to perform its functions.

Figure 11:
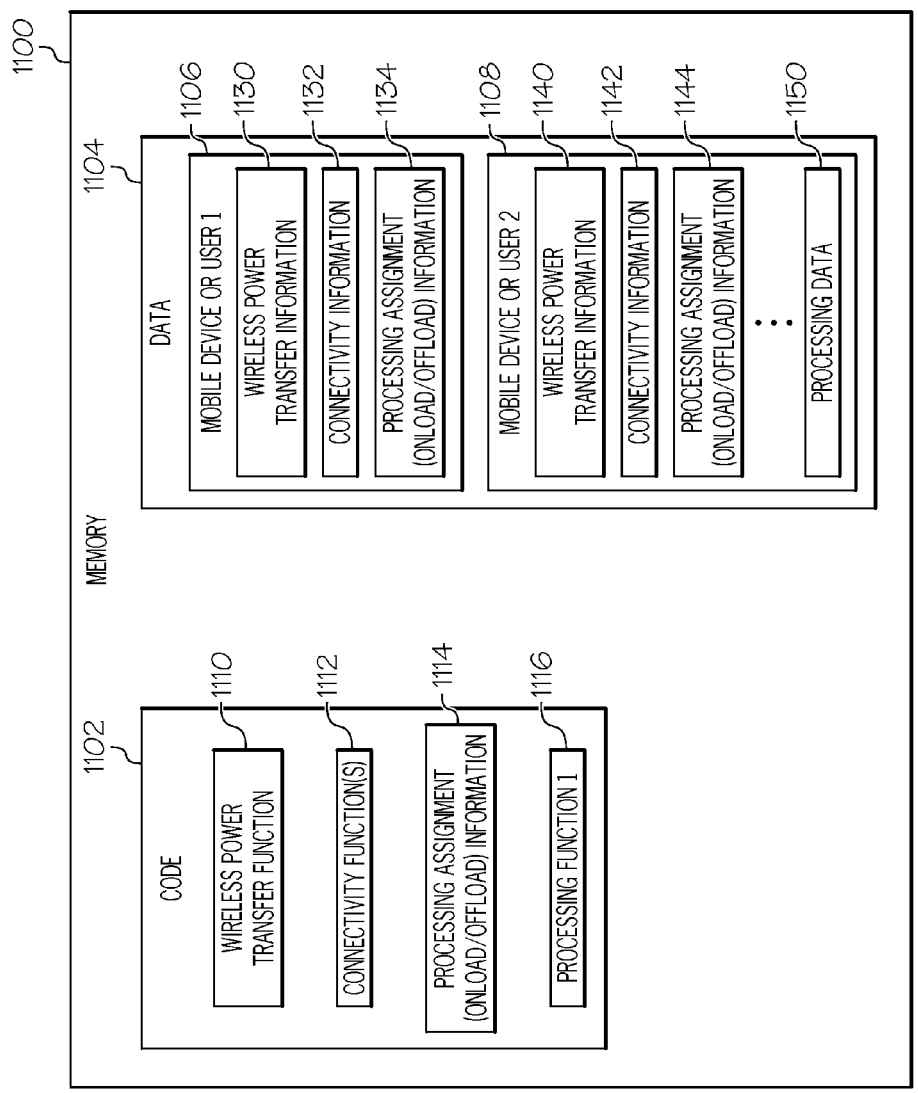
FIG. 11 illustrates a docking-charging station memory contents, according to an example.

FIG. 11 illustrates a docking-charging station memory contents 1100, according to an example. The docking-charging station memory contents 1100 depicts an example of the contents of the memory 210 of the docking-charging station 250 discussed above with regards to FIG. 2. The docking-charging station memory contents 1100 depicts code 1102 and data 1104. In an alternative example, another external device, such as server 120, is able to contain some or all of this code and data either in addition to or in place of the memory 210 of the docking-charging station 250. For example, an external device is able to store profile data that is associated with a particular device or user, and the external device is able to provide that stored profile data to the docking-charging station when that particular device, or a device associated with that particular user, establishes a docking station wireless connection with the docking-charging station.

The code 1102 includes wireless power transfer function 1110 that enables the docking-charging station 102 to perform wireless power transfer to the mobile device 104. The connectivity function(s) 1112 enable the docking-charging station 102 to conduct processing assigned to it on behalf of the mobile device 104 while the mobile device 104 is wirelessly docked. The processing assignment function 1114 indicates which entity is to perform functions communicated between the mobile device 104 and the docking-charging station 102. The code 1102 also includes other processing functions 1116 that is able to include, for example, functions the docking-charging station 102 is to perform on behalf of the mobile device 104.

The data 1104 includes data sets associated with different mobile devices or users. Illustrated are two such data sets, a mobile device or user data set A 1106 and a mobile device or user data set B 1108. These data sets form at least part of a profile, or configuration definition data set, that is able to be associated with various entities. In various examples, a profile is able to be associated with a particular mobile device, a user, a group of mobile devices or users, a profile that is a default profile applied to mobile devices or users that do not have another profile, a profile associated with any other entity or situation, or profiles that are associated with combinations of these.

In one example, a profile or configuration definition data set is able to be associated with a particular device or user by any suitable method. Such an association is able to be based on based upon an identification of the mobile device itself, or based upon an identification of a user of the device. A user of a mobile device is able to be identified by any suitable technique, such as by information stored on the mobile device or identification entered by the user when establishing a docking station wireless connection. In an example, a profile or configuration definition data set is able to be associated with a user's log-in identification or other credentials. In that example, the configuration definition data set associated with the user's credentials is used to configure connectivity for a mobile device under circumstances in which that user uses his or her credentials to connect to or otherwise access a docking-charging station from that mobile device. In another example, a profile or configuration definition data set is associated with a particular mobile device 104, such as by associating the configuration definition data set with the devices serial number, Mobile Equipment Identifier (MEID), International Mobile Equipment Identity (IMEI) number, other identification, or combinations of these. That configuration definition data set is then used to configure connectivity for the mobile device 104 whenever that device connects to a docking-charging station 102.

Each profile or configuration data set in this example includes wireless power transfer information 1130, 1140, connectivity information 1132, 1142, and processing assignment information 1134, 1144, for the different mobile devices. This information may be unique for each different mobile device, for each type of mobile device, or for each user. The data sets 1106, 1108 are able to be separately encrypted to protect the data related to each mobile device. Data 1104 also includes processing data 1150 to support performing the processing functions in code 1102. In an example, each profile or configuration data set corresponding to a respective mobile device, and each profile or configuration data set includes wireless power transfer information, connectivity assignments, processing assignment information for the respective mobile device, other information, or combinations of these. The data contained in the profile in one example is accessed by the processor of the docking-charging station when a mobile device establishes a docking station wireless connection applies that data in configuring wireless charging, connectivity, or processing assignments under circumstances in which a particular mobile device is docked to the docking-charging station 102.

In one example each profile or configuration data set that is stored in the data 1104 is separately encrypted. In such an example, the processor 302 of the docking-charging station 350 is able to separately encrypt each profile in a plurality of profiles. Separately encrypting profile data allows a particular docking-charging station to be used with multiple mobile devices and each mobile device or user is able to have securely stored profile data that is not accessible to other mobile devices or users. In one example, encryption keys used to access the separately encrypted profile data are able to be stored in association with the particular mobile device, such as on the mobile device or on a device accessible to the mobile device. Alternatively, encryption keys are able to be provided by a user such as through a passcode, biometric device, other technique, or combinations of these.

When a mobile device that is associated with a stored profile establishes a docking station wireless connection 132 with a docking-charging station storing profile information associated with that device or user, the information within the profile defined by the profile, or user data set, is able to be used, for example, to automatically define operating parameters for that mobile device, such as wireless power transfer configurations, processing assignments, wired or wireless connectivity that is to be provided between the mobile device and external devices, or combinations of these.

FIG. 12 illustrates a docking-charging station device configuration definition processing flow 1200, according to one example. The docking-charging station device configuration definition processing flow 1200 is performed in one example by the processor 202 within the docking-charging station 250, discussed above with regards to FIG. 3. The docking-charging station device configuration definition processing flow 1200 begins by receiving, at 1202, identification information from the mobile device 104. In one example, the identification information is received over a wireless connectivity. This may be performed in response to detecting that a mobile device 104 is in proximity to the docking-charging station 102. The identification information may include device identification information, mobile device identification information or user identification information, for example. The identification information may include one or more each of an IMEI number, device Identification, a device type or class identifier, a SIM number, a telephone number as defined by, for example, ITU-T Recommendation E.164 or E.123, a MAC address, an IP address, a PIN, a SKU, a UPC, an ICCID, a user ID, a carrier ID, a network ID, other information, or combinations of any number of these.

A mobile device configuration definition is received, at 1204, based on the identification. In one example, mobile device configuration definitions are stored in data items referred to as profiles. A profile is a data item that is able to contain configuration specifications for one or more devices, components, operational aspects, or combinations of this. Profiles are able to be associated with various entities, such as individual users, groups of users, a particular device, a particular type of device, entities based on other characteristics, or combinations of these. In an example, a profile is able to specify configuration data for various components and operational aspects of a mobile device, such as connectivity that is to be configured for the mobile device when that mobile device is connected to a particular docking-charging station.

The received mobile device configuration definition in one example is able to be contained in a configuration definition data set, which may or may not be in the form of a profile associated with the mobile device, another entity, or both, that is received based upon retrieving information from the memory 210 of the docking-charging station 250. The mobile device configuration definition is able to have been stored in the memory 210 under circumstances in which the particular mobile device 104 had been previously docked to the docking-charging station 102. Alternatively, the docking-charging station 102 is able to retrieve the configuration definition for the particular mobile device 104 by using the received identification to reference configuration definition information stored on another external device, such as server 120.

A mobile device configuration definition, such as is contained in a profile, is transmitted to the mobile device 104, at 1206. Wireless power is transferred, at 1208, from the docking-charging station 102 to the wireless device 104 as is specified by parameters in the received configuration definition. Connectivity information from the configuration definition is used to establish connectivity, at 1210, on behalf of the mobile device. In various examples, connectivity is established by processing performed by one or both of the mobile device 104 and the docking-charging station 102. Processing assigned to the docking-charging station 102, as specified by the configuration definition, is performed, at 1212.

FIG. 13 illustrates a mobile device configuration definition processing flow 1300, according to one example. The mobile device configuration definition processing flow 1300 is an example of a process performed by processor 302 of the mobile device 350. Identification information is wirelessly transmitted to the docking-charging station 102, at 1302. Such identification information may include one or more of the items noted above with respect to FIG. 12. In some examples, a mobile device configuration definition is received, at 1304, from the docking-charging station 102. In one example, the mobile device configuration definition is contained in a configuration definition data set that is contained in a profile that is able to specify various parameters such as wireless power transfer information, connectivity information or processing functions the mobile device is to perform. The mobile device 104 receives, at 1306, wireless transferred power from the docking-charging station 102. The mobile device 104 establishes connectivity, at 1308. Connectivity is able to be established in accordance with information stored in the mobile device 104, information received as part of the received configuration definition that may or may not be part of a profile, based upon other criteria, or combinations of these.

The mobile device 104 executes, at 1310, processing functions assigned to it. For example, one or more functions to be executed by the mobile device may be stored in memory 310 of the mobile device 350, functions to be executed by the mobile device may be received from the docking-charging station 102 or processors associated with it as defined by the mobile device configuration definition, functions to be executed by the mobile device may be received from the docking-charging station 102, or such functions may be obtained from combinations of these.

Figure 14:
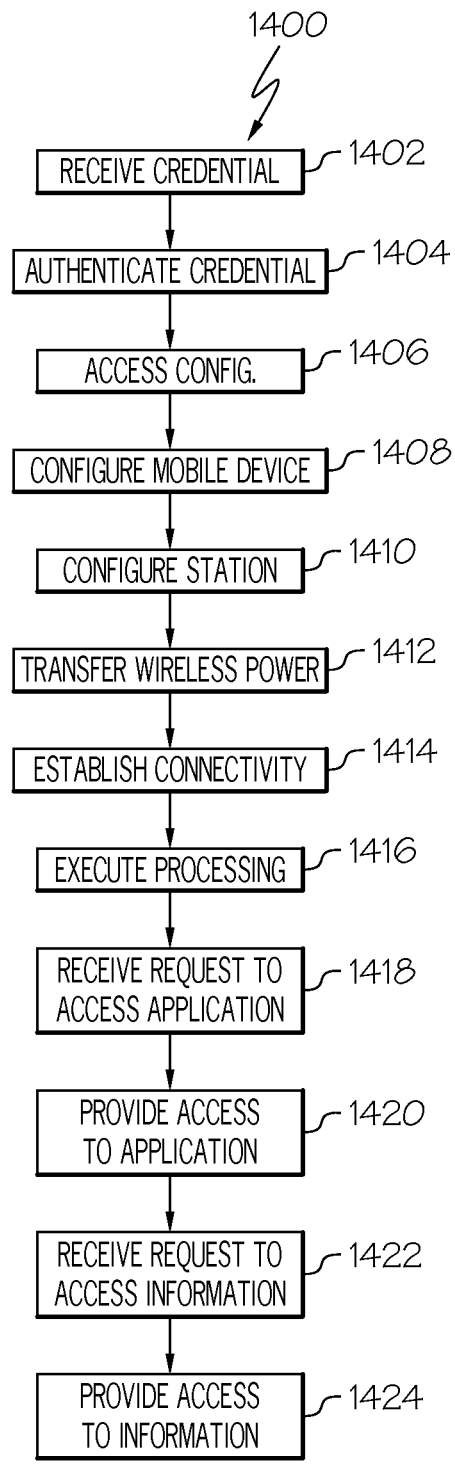
FIG. 14 is a docking-charging station credential processing flow, according to an example.

FIG. 14 is a docking-charging station credential processing flow 1400, according to an example. The docking-charging station credential processing flow 1400 is an example of processing performed by the processor 202 of the docking-charging station 250, described above. One or more credentials are received, at 1402, from the mobile device 104. These credentials may be transmitted wirelessly by the mobile device 104 to the docking-charging station 102. In one example, the credentials include a username or password. Alternatively, or in addition, a mobile device 104 equipped with a suitable biometric measurement device is able to receive credentials that include a biometric image or other specification of a finger, face or retinal scan.

In further examples, credentials are able to be contained in a configuration definition data set that is able to be associated with a user, device, other entity, or combinations of these. Under circumstances in which a configuration definition data set is received by, for example, other configuration processing, credentials that allow access to resources are also able to be received in the configuration definition data set and used to access those resources.

The received credentials are authenticated, at 1404. Authentication is able to include, for example, the docking-charging station 102 accessing a local or remote database to determine if the credentials, such as the username and password, are correct. In one example, a database to support validation of credentials is able to be resident on the docking-charging station 102, the database may reside elsewhere, such as on server 120, on other external devices, or on combinations of these. If the credential is not authenticated, then the docking-charging station credential processing flow 1400 stops in one example for security reasons. Conversely, in the case in which the credential is authenticated, a configuration definition associated with the credential is accessed and received, at 1406. This configuration definition may be stored locally in the station 102, remotely such as in the server 120, on another storage device, or on combinations of these.

The docking-charging station credential processing flow 1400 of one example configures, at 1408, the mobile device 104 and the docking-charging station 102 based on the accessed configuration definition. In one example, the docking-charging station 102 further transmits as part of the configuring, at 1408, information from the configuration definition to the mobile device 104 to cause the mobile device 104 to configure itself accordingly. The docking-charging station credential processing flow 1400 configures, at 1410, the docking-charging station 102 based upon specifications in the received configuration definition.

The docking-charging station credential processing flow 1400 continues by causing the docking-charging station 102 to wirelessly transfer, at 1412, power to the mobile device 104. In one example, parameters of the wireless transfer of power are defined according to information contained in the received configuration definition. Connectivity is established, at 1414, between the mobile device 104 and various external devices. Processing assigned to the docking-charging station 102 according to the received configuration definition is executed, at 1416.

The docking-charging station 102 in one example receives, at 1418, a wireless request from the mobile device 104 to access an application. This application is able to be an application that is executing on the docking-charging station 102, an application executing on server 120, applications running elsewhere, or combinations of these. The docking-charging station credential processing flow 1400 provides access to the requested application in one example through the established connectivity, at 1420, from the mobile device 104 to the processor executing the requested application. The docking-charging station credential processing flow 1400 receives a request to access information, at 1422. This information may be stored locally in the docking-charging station 102, it may be stored remotely such as on server 120, it may be stored elsewhere, or stored on combinations of these. In the case of information stored remotely from the docking-charging station 102, the docking-charging station 102 provides connectivity, at 1424, to retrieve the requested information from the location storing the information in order to provide the mobile device 104 with access to this information. In further examples, information is able to be communicated in one direction or in both directions with the mobile device based upon the credential information.

In various examples, credentials are used to control access to various types of restricted network resources that are available to the docking station, such as the docking-charging station 102. Examples of restricted network resources include the above described applications and information to which access is controlled by credentials. Further restricted network resources include, for example, printers, sub-networks, any other type of network resource, or combinations of these that are in communication with the docking station and that require validation of credentials prior to being granted access to those resources. In such examples, credentials are provided by various techniques, such as by being included in configuration definition data sets, by being provided by a user input to the mobile device and communicated to the docking station, by being entered by a user into the docking station, by being otherwise configured in a device, by other techniques, or by combinations of these. In some examples, access to the restricted network resource is provided based upon the credential information.

Figure 15:
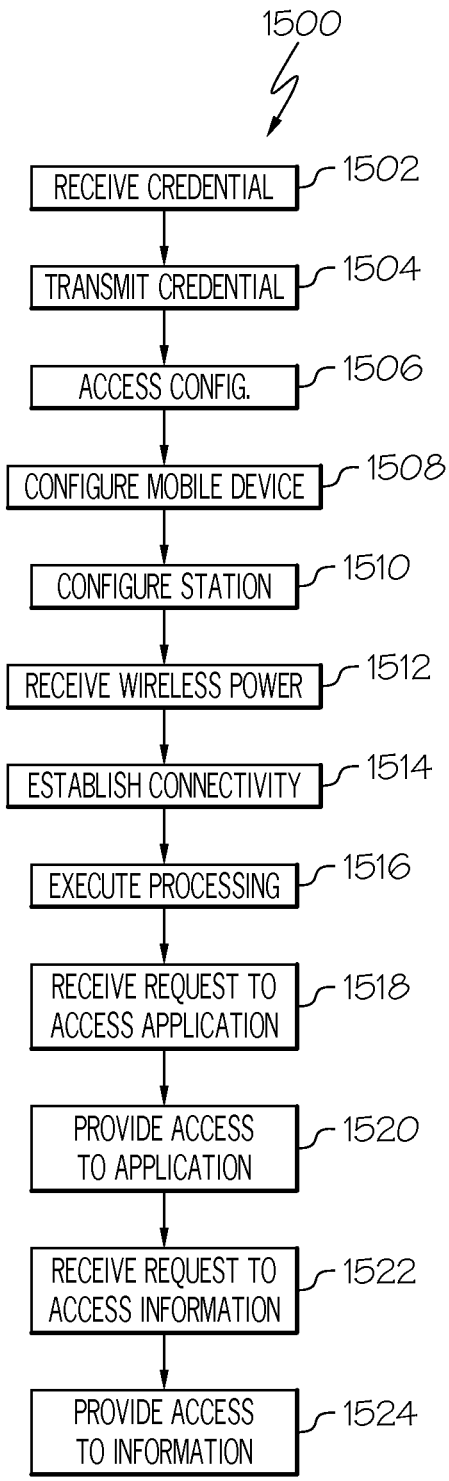
FIG. 15 is a mobile device credential processing flow, according to an example.

FIG. 15 is a mobile device credential processing flow 1500, according to an example. The mobile device credential processing flow 1500 is an example of processing performed by the processor 302 of the mobile device 350, described above. A credential is received, at 1502, by the mobile device 104. The credential that is received in one example is based on input by a user of a username and password. Alternatively, or in addition, the credential is able to be a biometric image, specification, or other data relating to, for example, a person's fingerprint, face or retinal pattern.

The mobile device credential processing flow 1500 transmits, at 1504, the credential to the docking-charging station 102 for authentication. In the case in which the credential is authenticated, the mobile device credential processing flow 1500 proceeds to access, at 1506, the configuration definition. In one example, connectivity through the docking-charging station 102 facilitates access to the configuration definition. The mobile device credential processing flow 1500 configures, at 1508, the mobile device 104 based upon the information contained in the configuration definition. This configuration is able to include configuration of various components for wireless interaction with the docking-charging station 102, other external devices, or both.

The mobile device credential processing flow 1500 proceeds to cause the docking-charging station 102 to be configured, at 1510, for wireless power transfer to the mobile device, connectivity between the mobile device 104 and other external devices, processing function assignment, or combinations of these. The mobile device credential processing flow 1500 wirelessly receives, at 1512, power from the docking-charging station 102 according to the configuration defined by the received configuration definition. The mobile device credential processing flow 1500 establishes, at 1514, connectivity for the mobile device 104, and in one example causes the docking-charging station 102 to establish connectivity according to the configuration defined by the configuration definition.

The mobile device credential processing flow 1500 executes, at 1516, processing functions assigned to the mobile device 104 according to the received configuration definition. The mobile device credential processing flow 1500 receives, at 1518, a request to access an application executing on a remote device, such as the docking-charging station 102, server 120, another processor, or combinations of these. In one example, the request to access an application is able to be received in conjunction with receiving an input from a user into the mobile device 104, through another external device such as a keyboard or mouse to which the mobile device 104 has established connectivity, another input, or combinations of these. The mobile device credential processing flow 1500 transmits the request to the docking-charging station 102. In one example, the request is transmitted wirelessly, such as over the docking station wireless data connection 132. Access is then provided, at 1520, to the requested application. In an example that includes the docking-charging station 102 hosting the application, the docking-charging station 102 provides access to the application to the mobile device 104. Alternatively, the docking-charging station 102 is able to forward the request to a remote processor, such as server 120, that is executing the application in order to provide access to the application by the mobile device 104 via the docking-charging station 102.

The mobile device credential processing flow 1500 receives, at 1522, a request to access information. The mobile device 104 is able to forward this request to the docking-charging station 102 in order to handle the request, or the docking-charging station 102 is able to forward the request to another external device, such as server 120, that is storing the information requested. In response to the request for access to information, access is provided, at 1524, to the information. In on example, the docking-charging station 102 retrieves the information from its own memory, receives it from another external device such as server 120 storing the information, or combinations of these, and provides the information to the mobile device 104. In one example, the mobile device 104 is able to render a presentation to a user based on the received information.

FIG. 16 illustrates is a docking-charging station network connectivity processing flow 1600, according to an example. The docking-charging station network connectivity processing flow 1600 is an example of a process performed by the processor 202 of the docking-charging station 250 described above. The docking-charging station network connectivity processing flow 1600 wirelessly transfers, at 1602, power to the mobile device 104. The docking-charging station network connectivity processing flow 1600 establishes, at 1604, connectivity on behalf of the mobile device 104 in order to enable communications between the mobile device 104, the docking-charging station 102, and other external devices that are connected to the docking-charging station 102, such as are described above with regards to FIG. 1.

The docking-charging station network connectivity processing flow 1600 registers, at 1606, the mobile device 104. In one example, registering the mobile device 104 includes receiving from the mobile device 104 identification information used to register the device with a data communications network. In one example, the docking-charging station is able to register the mobile device 104 with the network, or the docking-charging station 102 is able to transmit the identification information to an external device, such as the server 120, that operates to register the mobile device 104 within a communication network in which the docking-charging station 102 or the server 120 is a node.

The docking-charging station network connectivity processing flow 1600 receives, at 1608, a request to establish a connection through the network. This request may be received from the mobile device 104 under circumstances in which the mobile device 104 is commencing the communication. The request is also able to be received by the docking-charging station 102 from another external device in the network under circumstances in which that other external device is commencing the communications. In the case of another external device commencing the communications, the docking-charging station 102 is able to transmit the received request to the mobile device 104. The docking-charging station network connectivity processing flow 1600 establishes, at 1610, the connectivity by transferring the necessary signals from the mobile device 104 to the source or target external device.

FIG. 17 illustrates is a mobile device network connectivity processing flow 1700, according to an example. The mobile device network connectivity processing flow 1700 is an example of a process performed by the processor 302 of the mobile device 350 described above. The mobile device network connectivity processing flow 1700 causes the mobile device to wirelessly receive, at 1702, power from the docking-charging station 102. The mobile device network connectivity processing flow 1700 establishes, at 1704, connectivity with the docking-charging station 102 and in one example further establishes connectivity with one or more other external devices connected to the docking-charging station 102, such as the external device described above with regards to FIG. 1. The mobile device network connectivity processing flow 1700 registers, at 1706, the mobile device 104 for network communication. Registering the mobile device 104 for mobile configuration is able to include, in one example, forwarding identification information to the docking-charging station 102. In such an example, the docking-charging station 102 is able to register the mobile device 104 with the communications network, or the docking-charging station 102 is able to transmit the identification information to an external device, such as server 120, that operates to register the mobile device 104 on the communications network. Registration on the communications network allows the mobile device 104 to communicate with other external devices connected to that network. The mobile device network connectivity processing flow 1700 receives or transmits, at 1708, a request to connect the mobile device 104 to an external device connected to the network, such as another mobile device or a computer, for example. The mobile device network connectivity processing flow 1700 establishes, at 1710, the connectivity with the target or source external device for the connectivity request. In so doing, the mobile device 104 may transmit or receive one or more protocol or standard signals with the target or source external device via the docking-charging station 102. Thus, in one example, the mobile device 104 is able to transmit or receive a cellular network or VoIP call with the other external device via the docking-charging station 102.

Figure 18:
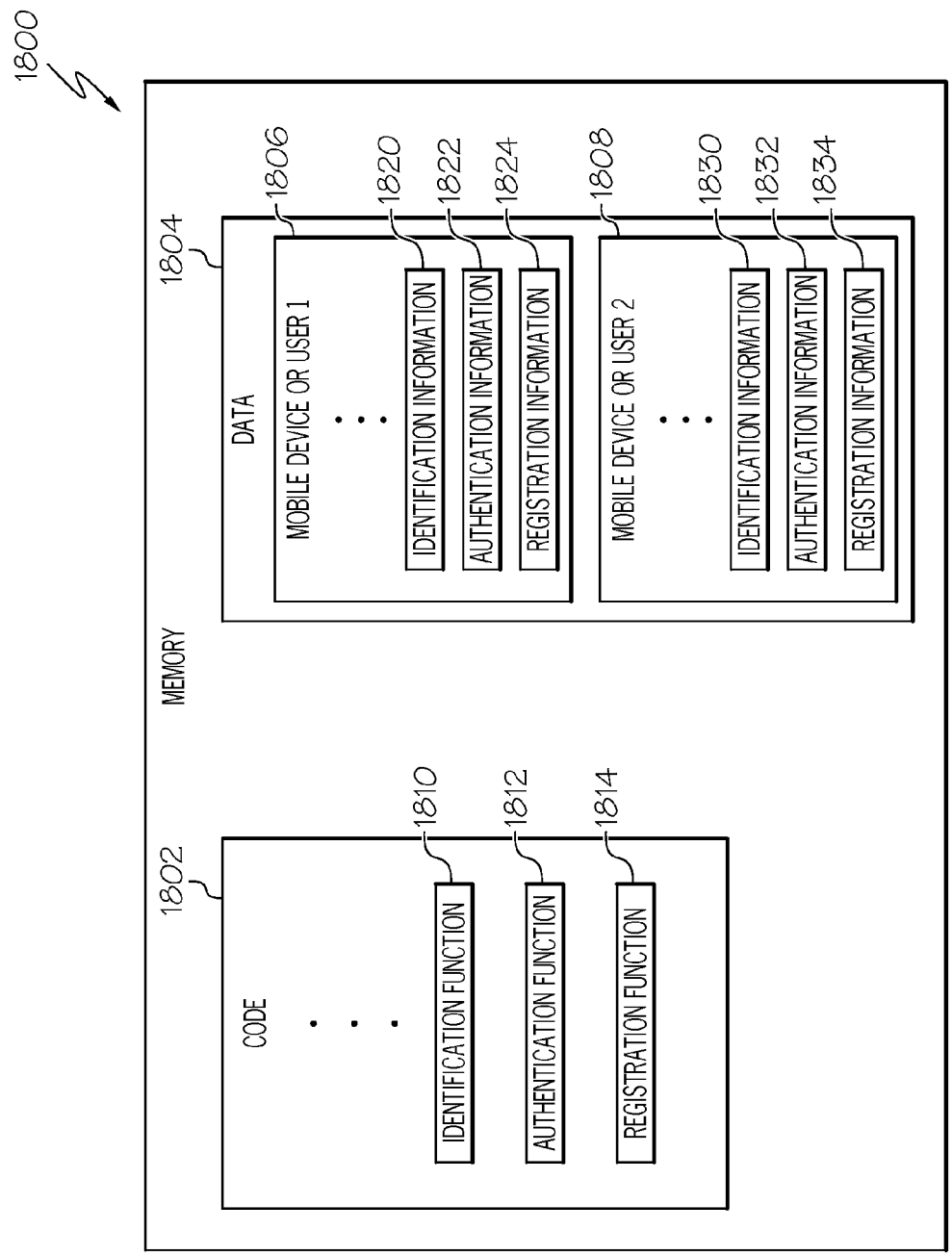
FIG. 18 illustrates a docking-charging station authentication processing memory contents, according to an example.

FIG. 18 illustrates a docking-charging station authentication processing memory contents 1800, according to an example. The docking-charging station authentication processing memory contents 1800 illustrates contents of memory of, for example, the memory 210 of the docking-charging station 250 as described above. The docking-charging station authentication processing memory contents 1800 is alternatively able to represent memory contents of another processor performing authentication, such as the server 120. The docking-charging station authentication processing memory contents 1800 is an example of memory contents that support the processing described above with regards to FIGS. 12-17. The docking-charging station authentication processing memory contents 1800 includes code 1802 and data 1804.

Data 1804 stores configuration definitions, or information sets, for a number of mobile devices or users. In one example, each configuration definition is able to be a profile that is associated with a device, a user, a group of devices or users, a profile that is a default profile applied to devices or users that do not have another profile, a profile associated with any other entity or situation, or profiles that are associated with combinations of these. Further, the data 1804 is able to include profiles associated with a user, device, another of the above listed entities, any other entity, or combinations of these, that include the configuration definitions as well as any other type of data.

The illustrated docking-charging station authentication processing memory contents 1800 depict an example of two configuration definitions, or information sets, that each corresponds to a different mobile device or user. In general, data sets for any number of mobile devices or users are able to be stored in data 1804. The mobile device or user configuration definition information sets 1806, 1808 include information as described above with regards to FIGS. 16 and 17, including identification information 1820, 1830, authentication information 1822, 1832, and registration information 1824, 1834. In some examples, each profile or configuration definition stored in the data 1804 is able to be separately encrypted. In an example, processor 302 of the docking-charging station 350 is able to separately encrypt each profile in a plurality of profiles.

The code 1802 includes an identification function 1810 that performs processing to access configuration definition information sets 1806, 1008, using identification information 1820, 1830, to identify the configuration definition information sets 1806, 1808, for a particular mobile device. The authentication function 1812 is able to be executed by a processor of the mobile device 104, the docking-charging station 102, server 120, other processors, or combinations of these, to handle access to configuration definition information sets 1806, 1808, in which authentication information 1822, 1832, is able to be used to authenticate the mobile device or its user. The registration function 1814 registers the mobile device 104 to a communications network via the docking-charging station 102 in order to receive or transmit information with source or target external devices on the network. The registration function in one example uses registration information 1824, 1834 to register the mobile device.

Figure 19:
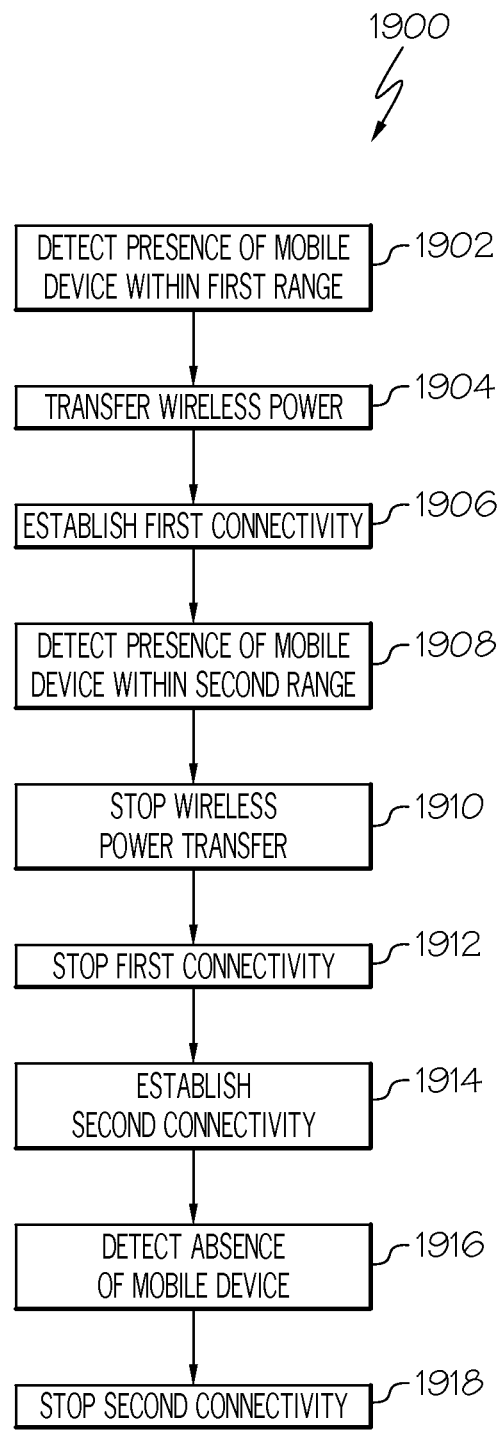
FIG. 19 is a docking connectivity establishment processing flow, according to an example.

FIG. 19 is a docking connectivity establishment processing flow 1900, according to an example. The docking connectivity establishment processing flow 1900 is able to be performed by the processor 202 of the docking-charging station 250, described above.

The presence of a mobile device 104 within a first range of the docking-charging station 102 is detected, at 1902. Detecting that the mobile device 104 is within the first range of the docking station 102 is an example of determining that a mobile device is within a first range of a docking station. In one example, a first range is defined as being within 5 cm or less of the docking-charging station 102, which corresponds to a common range for NFC communications or wireless power transfer using a system compliant with the Qi standard. In various examples, determining that the mobile device is within a first range of a docking station includes detecting an NFC connectivity from the mobile device or receiving an indication that the mobile device is receiving a wireless power transfer signal. In a further example determining that the mobile device is within a first range of a docking station includes monitoring characteristics of a signal emitted by the mobile device, such as a signal strength or baseband bit error rate of a Bluetooth signal emitted by the mobile device.

Based on, or in response to, determining that the mobile device 104 is within the first range of the docking-charging station 102, the docking connectivity establishment processing flow 1900 causes power to be wirelessly transferred, at 1904, to the mobile device 104. Power is wirelessly transferred in one example by the docking-charging station 102 emitting a wireless power transfer signal 130, as is described above.

The docking connectivity establishment processing flow 1900 establishes, at 1906, a first connectivity on behalf of the mobile device 12. The first connectivity in one example is established by establishing Near Field Communications (NFC). In another example, the first connectivity is established by establishing a Wi-Fi or WiGig data connectivity.

In one example, as the mobile device 104 is further than the first distance from the docking-charging station 102, the docking connectivity establishment processing flow 1900 detects, at 1908, that the presence of the mobile device 104 within a second range of the docking-charging station 102. In one example, the second range is greater than 5 cm and less than 200 meters, which corresponds to an effective wireless communications range for various protocols, such as Bluetooth, WiFi, or WiGig communications systems, but exceeds the effective distance over which many wireless power transfer systems are able to efficiently operate. In response to detecting the mobile device 104 is within the second range from the docking-charging station 102, the docking connectivity establishment processing flow 1900 stops, at 1910, wireless power transfer to the mobile device 104. Power transfer is stopped in one example to reduce power consumption. Further in response to determining that the mobile device 104 is within the second range of the docking-charging station 102, the docking connectivity establishment processing flow 1900 stops, at 1912, the first connectivity. In one example, once the mobile device is further than the first distance from the docking-charging station 102, the mobile device is outside of the effective communications range for the first connectivity. The docking connectivity establishment processing flow 1900 establishes, at 1914, a second connectivity between the mobile device 104 and the docking-charging station 102. In various examples, the second connectively is able to be, for example, a Bluetooth connectivity, a WiFi connectivity, other data connectivity, or combinations of these.

Under circumstances in which the distance from the mobile device 104 to the docking-charging station 102 is farther than the maximum distance of the second range, the docking connectivity establishment processing flow 1900 detects, at 1916, an absence of the mobile device 104 relative to the second connectivity. In one example, the absence is detected by the lack of connectivity over the second connectivity, such as under circumstances in which the distance from the mobile device 104 to the docking-charging station 102 causes the loss of communications over second connectivity, which in some examples is a Bluetooth or WiFi data connectivity. In detecting the absence of the mobile device 104 relative to the second connectivity, the distance from the mobile device 104 to the docking-charging station 102 is assumed to be farther than the effective range of the second connectivity. The docking connectivity establishment processing flow 1900 stops, at 1918, the second connectivity by turning off the second connectivity. The second connectivity is turned off in one example in order to avoid unnecessary processing and power consumption.

Figure 20:
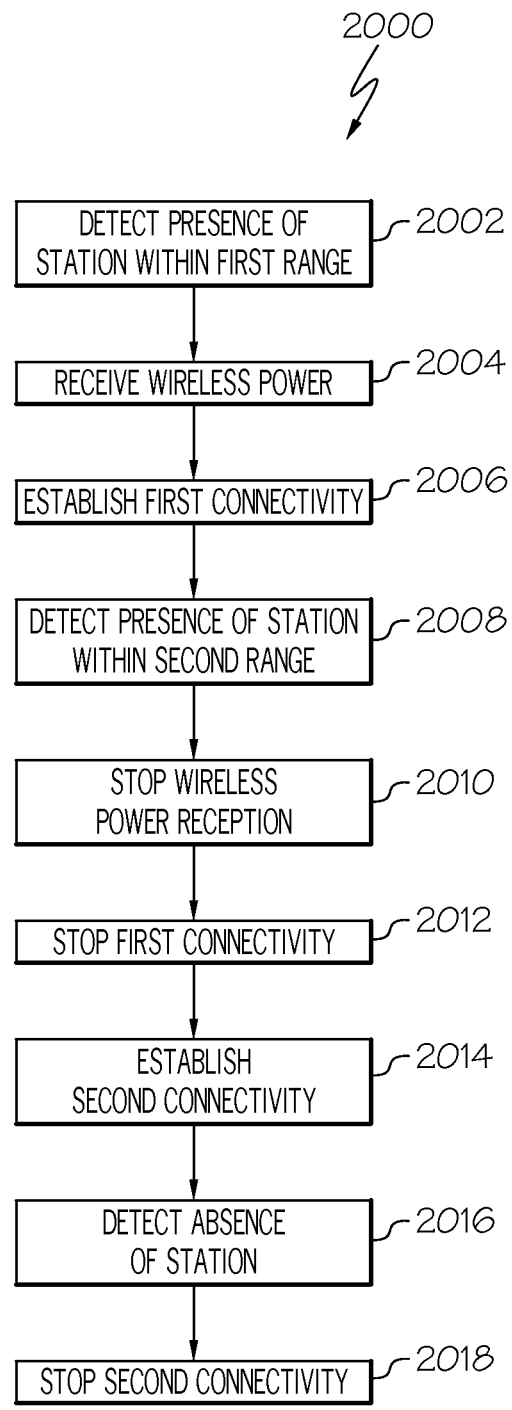
FIG. 20 is a mobile device docking connectivity establishment processing flow, according to an example.

FIG. 20 is a mobile device docking connectivity establishment processing flow 2000, according to an example. The mobile device docking connectivity establishment processing flow 2000 is able to be performed by the processor 302 of the mobile device 350, described above.

The mobile device docking connectivity establishment processing flow 2000 begins by detecting, at 2002, the presence of a docking-charging station 102 within a first range of the mobile device 104. As discussed above with regards to the docking connectivity establishment processing flow 1900, the first range in one example is defined to be 5 cm or less which corresponds to the effective communications range for NFC communications or for wireless power transfer using systems complying with the Qi standard. Based on the detection of the presence of the docking-charging station 102 within the first range of the mobile device 104, the mobile device docking connectivity establishment processing flow 2000 transfers, at 2004, wirelessly transmitted power from the docking-charging station 102. In response to the detection of the presence of a docking-charging station 102 within a first range of the mobile device 104, the mobile device docking connectivity establishment processing flow 2000 in one example further establishes, at 2006, connectivity with the docking-charging station 102 through a first connectivity and also establishes connectivity to external devices that are attached to the docking-charging station 102. As discussed above, the established connectivity is able to be defined by, for example, configuration definitions for the particular mobile device 104, a general configuration definition, user selections, other techniques, or combinations of these.

As the mobile device 104 moves away from the docking-charging station 102, the mobile device docking connectivity establishment processing flow 2000 detects, at 2008, the presence of the docking-charging station 102 within a second range from the mobile device 104. As discussed above with regards to the docking connectivity establishment processing flow 1900, the second range in one example is defined to be greater than 5 cm and less than 200 meters. Based on detecting the presence of the docking-charging station 102 within a second range of the mobile device 104, the mobile device docking connectivity establishment processing flow 2000 stops, at 2010, receiving wireless power transfers from the docking-charging station 102, and further stops, at 2012, the first connectivity that was configured through the docking-charging station. In one example, receiving wirelessly transferred power and the first connectivity are stopped because the mobile device 104 is out of the effective range for such transfers or communications. The mobile device docking connectivity establishment processing flow 2000 establishes, at 2014, a second connectivity by establishing a second connectivity with the docking-charging station 102 and associated connectivity to external devices associated with the docking-charging station 102. In some examples, the second connectivity is a Bluetooth connectivity, a WiFi connectivity, or a WiGig connectivity. As the mobile device 104 moves further away from the docking-charging station, the mobile device docking connectivity establishment processing flow 2000 detects, at 2016, an absence of the docking-charging station 102. Based upon detecting the absence of the docking-charging station 102, the mobile device docking connectivity establishment processing flow 2000 stops, at 2018, the second connectivity.

Figure 21:
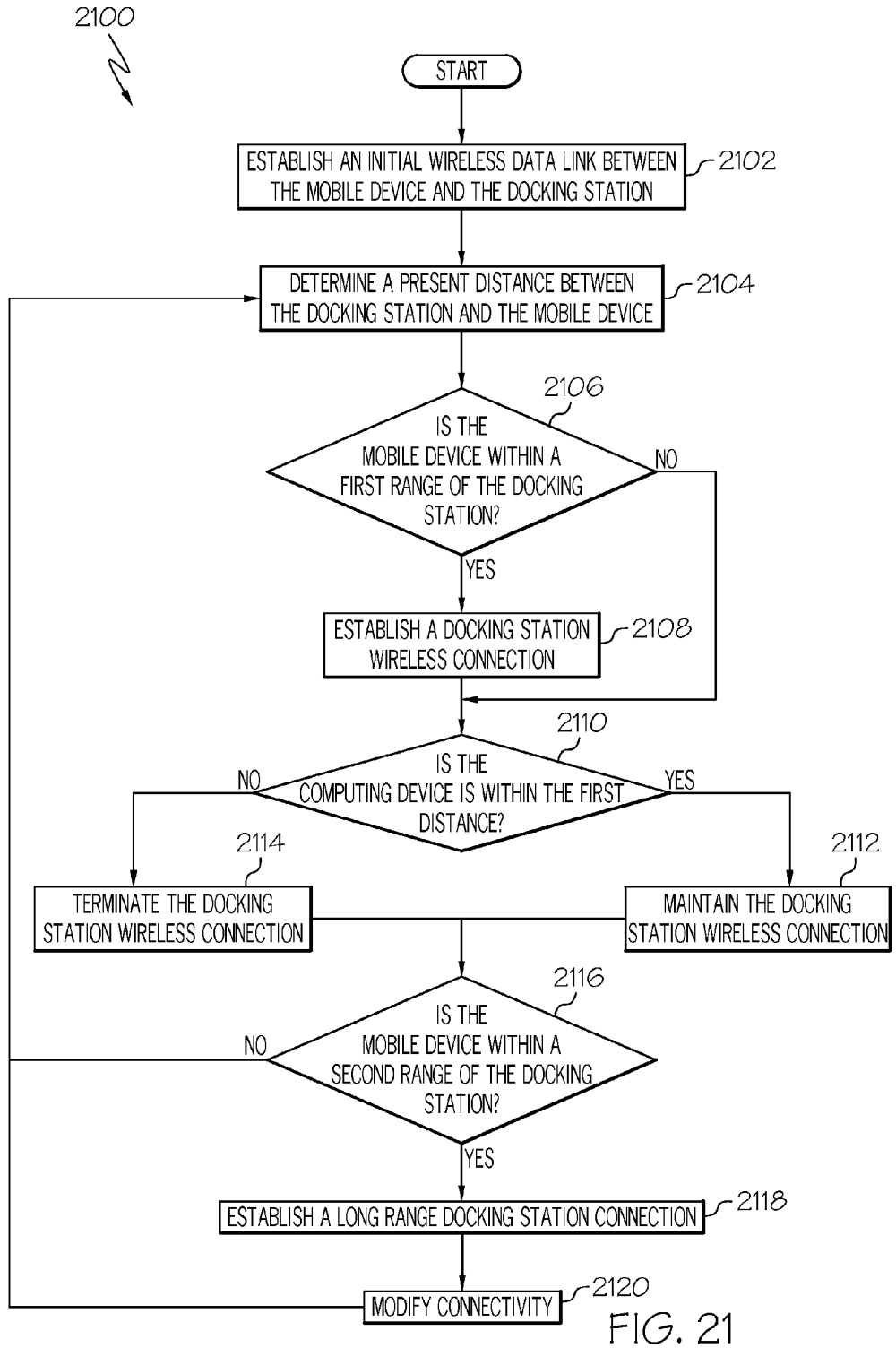
FIG. 21 illustrates a docking station wireless connection management process, according to an example.

FIG. 21 illustrates a docking station wireless connection management process 2100, according to an example. The docking station wireless connection management process 2100 is performed in one example to establish and maintain a docking station wireless connection 132 between the mobile device 104 and the docking station 102. The docking station wireless connection management process 2100 in various examples is performed by the processor 202 in the docking-charging station 250, the processor 302 in the mobile device 350, on or more other processors in various devices, or the process is able to be divided between or among two or more such processors.

The docking station wireless connection management process 2100 begins by establishing, at 2102, an initial wireless data connectivity between the mobile device and the docking station. In one example, the initial wireless data connectivity is a Bluetooth data connectivity. The docking station wireless connection management process 2100 determines, at 2104, a present distance between the docking station and the mobile device. In one example, that distance is determined based upon a characteristic of the initial wireless data connectivity. For example, a received signal strength of the initial wireless connectivity is able to be used as an indication of a distance over which the initial wireless connectivity travels. In further examples, other techniques, such as a round trip delay for a signal that is transmitted from a first device to a second device, and the second device sends a response after a determined time delay from receiving the first signal. Alternatively, the present distance between the docking station and the mobile device is able to be determined by measuring a time duration of signal propagation between those two devices. For example, transmitted data packets are able to include time stamps that indicate a time of transmission for the that data packet, and the propagation time is able to be determined by comparing the time of transmission to a time of receipt of the data packet by the receiving device, or to a time of receipt by the originating device of an acknowledgement of receipt of the data packet. In one example, a time stamp indicating a time of receipt of the data packet by the receiver is able to be used for such a determination, such as by being included in the acknowledgement.

The docking station wireless connection management process 2100 then determines, at 2106, if the mobile device is within a first range of the docking station. In one example, determining if the mobile device is within a first range of the docking station is based upon the above determined distance that is determined based on the characteristic of the initial wireless connectivity. As discussed above, the first range is a relatively short range that facilitates establishing and maintaining a high speed wireless data connectivity that consumes a reasonable amount of electrical power. As discussed above, the first range in one example is approximately 5 cm.

If it is determined that the mobile device is within the first distance of the docking station, a docking station wireless connectivity through a docking station wireless connection is established, at 2108. In one example, a short range docking station connection is established based on determining that the mobile device is within the first range of the docking station. A short range docking station connection in one example is able to be a high speed data communications path. In another example, the short range docking station connection is able to be a low power data communications path, such as a Bluetooth channel.

After establishing the docking station wireless connection, or if it is not determined that the mobile device is not within the first distance, the docking station wireless connection management process 2100 again determines at 2110, if the mobile device is within the first distance. If this determination is true, the docking station wireless connection management process 2100 maintains, at 2112, the docking station wireless connection. In response to determining the mobile device is not within a first range of the docking station the docking station wireless connection management process 2100 terminates, at 2114, the docking station wireless connection, which is able to be a short range docking station wireless connectivity.

The docking station wireless connection management process 2100 continues by determining, at 2116, if the mobile device is within a second range of the docking station such that the second range being outside of and farther from the docking station than the first range. Based on determining the mobile device is within the second range, a long range docking station connection is established, at 2118. At least one wired connectivity and wireless connectivity are modified, in one example, Based on determining that the mobile device is within the second range and outside the first range. The docking station wireless connection management process 2100 then returns to determining, at 2104, the distance between the mobile device and the docking station, as is described above. In one example, the long range docking station connection is a Bluetooth connectivity that is established as the initial wireless connectivity, and the communications protocols are adjusted to route a subset of docking station data across the Bluetooth connection. In a further example, the long range docking station connection is a wireless data connectivity that conforms to a different protocol than the docking station wireless connection that is established under circumstances in which the mobile device is determined to be within the first range.

The docking station wireless connection management process 2100 described above allows an initial wireless connectivity, such as a Bluetooth connectivity, that consumes relatively low levels of electrical power, to be used to determine if the two devices are close enough to establish a docking station wireless connection, which generally consumes more electrical power. Further, wireless charging is likely to be able to occur to provide the power consumed by the docking station wireless connection under circumstances in which the mobile device is within the first range.

The above described methods include several aspects. In an example, a method performed by a station for charging and docking a mobile device includes detecting presence of the mobile device, transferring wireless power to the mobile device; and, establishing connectivity with an external device on behalf of the mobile device. Also included are detecting an absence of the mobile device, stopping the wireless power transfer, and stopping the connectivity. A method performed by a station for charging and docking a mobile device can include detecting presence of the mobile device, transferring wireless power to the mobile device, and executing onload or offload processing through wireless communication with the mobile device. Also included are detecting absence of the mobile device, stopping the wireless power transfer, and stopping the onload or offload processing. A method performed by a station for charging and docking a mobile device can include detecting presence of the mobile device, receiving wireless power transfer information for the mobile device, transferring wireless power to the mobile device, receiving connectivity assignment information, establishing connectivity with an external device on behalf of the mobile device based on the connectivity assignment information, receiving processing assignment information, and executing processing on behalf of the mobile device based on the processing assignment information. Optionally included are detecting absence of the mobile device, stopping the wireless power transfer to the mobile device, stopping connectivity on behalf of the mobile device, and stopping the processing on behalf of the mobile device. A method performed by a station for wirelessly docking a mobile device can include receiving mobile device identification information from the mobile device, receiving connectivity configuration information for the mobile device, storing connectivity configuration information for the identified mobile device, and establishing connectivity for the mobile device with an external device based at least partly upon the connectivity configuration information. A method performed by a station wirelessly docking a mobile device can include receiving a request for display of connectivity information, receiving connectivity information, and generating a display of the connectivity information. Optionally included are wherein the connectivity information indicates at least one external device and specific connectivity supporting connectivity of the mobile device to such external device, wherein the external device comprises at least one of a display, speakers, keyboard, mouse, server, media player, printer, scanner or copier, or wherein the specific connectivity includes at least one wireless connectivity, also wherein the specific connectivity includes at least one wired connectivity, wherein the connectivity status is displayed in association with the external device and specific connectivity. A method performed by a station wirelessly docking a mobile device can include receiving a request to edit a connectivity configuration including connectivity supported by the station on behalf of the mobile device, receiving input to edit the connectivity configuration, modifying the connectivity configuration information based on the received input, storing the modified connectivity configuration information, and modifying the connectivity of the station based on the modified connectivity configuration information. A method performed by a mobile device wirelessly charging and docking with a station can include receiving wireless power from the station, transmitting a connectivity configuration to the station for establishing connectivity with at least one external device on behalf of the mobile device, and establishing connectivity with the at least one external device based at least partly upon the connectivity configuration. Optionally included are wherein the connectivity is wireless and the external device includes at least one of a display, speakers, keyboard, or mouse. A method performed by a mobile device wirelessly charging and docking with a station can include receiving wireless power from the station, receiving a connectivity configuration from the station for establishing connectivity at of the mobile device, and establishing connectivity with at least one external device. Optionally included are wherein the connectivity is wireless and the external device includes at least one of a display, speakers, keyboard, or mouse. A method performed by a mobile device wirelessly charging and docking with a station can include receiving wireless power from the station, and offloading processing to the station. A method performed by a mobile device wirelessly charging and docking with a station can include receiving wireless power from the station, and onloading processing from the station. A method performed by a mobile device wirelessly charging and docking with a station can include receiving wireless power from the station, and transmitting wireless power transfer information to the station, transmitting a connectivity assignment to the station, and offloading processing to the station.

Further methods performed by a wireless station can include receiving identification information from a mobile device, receiving a mobile device profile based on the identification information, transferring wireless power to the mobile device based on the mobile device profile, establishing connectivity based on the mobile device profile, and executing processing based on the mobile device profile. A method performed by a mobile device wirelessly docking to a station can include transmitting identification information to the station, receiving profile information based on the identification information from the station, receiving wireless power from the station based on the profile, establishing connectivity based on the profile, and executing processing based on the profile. A method performed by a station wirelessly docking with a mobile device can also include receiving credential information from the mobile device, authenticating the credential information, accessing a profile based on the authenticating if successful, wirelessly configuring the mobile device based on the profile, wirelessly configuring the station based on the profile, transferring wireless power to the mobile device based on the profile, establishing connectivity on behalf of the mobile device based on the profile, and executing processing on behalf of the mobile device based on the profile. The method may optionally include receiving a request from the mobile device to access an application, and providing the mobile device with access to the application; or receiving a request from the mobile device to access information, and providing the mobile device with access to the information.

A method performed by a mobile device wirelessly docking to a station is able to include receiving a credential input to the mobile device, wirelessly transmitting the credential to the station, accessing a profile based on authentication of the credential, configuring the mobile device based on the profile, and configuring the station based on the profile. The method is also able to include receiving wireless power from the station based on the profile, establishing connectivity based on the profile, and executing processing based on the profile; receiving a request to access an application, and providing access to the application via the station; or receiving a request to access information, and providing access to the information via the station.

A method performed by a station wirelessly docking a mobile device is able to include transferring wireless power to the mobile device, establishing connectivity on behalf of the mobile device, registering the mobile device to communicate on a communications network, receiving a request to connect, and establishing connectivity for the mobile device based on the registering. A method performed by a mobile device wirelessly docking to a station is able to include receiving wireless power from the station, establishing connectivity with at least the station, registering the mobile device on a communications network via the station, receiving or transmitting a request to connect, and establishing connectivity via the station based on the registering. A method performed by a station in wirelessly docking a mobile device can include detecting presence of a mobile device within a first range of the station, transferring wireless power to the mobile device in response to detecting the mobile device within the first range, establishing first connectivity with the mobile device, detecting presence of the mobile device within a second range outside of the first range, stopping wireless power transfer to the mobile device in response to detecting the mobile device within the second range, stopping the first connectivity, and establishing second connectivity with the mobile device. The method is also able to include detecting absence of the mobile device, and stopping the second connectivity In response to detecting the absence of the mobile device. In the method, the first connectivity is able to be NFC and the second connectivity is able to be Bluetooth, WiFi or WiGig.

A method performed by a mobile device wirelessly docking to a station is able to include detecting presence of a station within a first range of the mobile device, receiving wireless power from the station in response to detecting the presence of the station within the first range, establishing first connectivity with the station, detecting presence of the station within a second range outside of the first range, stopping wireless power reception in response to detecting the presence of the station within the second range, stopping the first connectivity, and establishing second connectivity with the station. The method is also able to include detecting absence of the station, and stopping the second connectivity with the station in response to detecting the absence of the station. A method performed by a station wirelessly docking a mobile device is able to include detecting presence of a mobile device, wirelessly transferring power to the mobile device, establishing connectivity on behalf of the mobile device, and syncing information stored on the mobile device with information stored on the station or other external device in communication with the station. A method performed by a mobile device wirelessly docking to a station can include detecting presence of the station, receiving wireless power from the station, establishing connectivity with the station, syncing information stored on the mobile device with information stored on the station or other external device in communication with the station. A method performed by a station wirelessly docking a mobile device can include detecting presence of the mobile device, receiving a connectivity assignment from the mobile device, establishing connectivity based on the connectivity assignment, receiving a processing assignment from the mobile device, and executing processing based on the processing assignment. The method is also able to include detecting absence of the mobile device, stopping connectivity with the mobile device in response to detecting the absence of the mobile device, and stopping processing on behalf of the mobile device.

A method performed by a mobile device docking to a station is able to include detecting presence of the station, wirelessly transmitting connectivity assignment information in response to detecting presence of the station, establishing wireless connectivity with the station, wirelessly transmitting processing assignment information, and executing processing assigned to the mobile device. The method is also able to include detecting absence of the station, stopping wireless connectivity in response to detecting absence of the station, and stopping the processing.

A station for wirelessly docking and charging a mobile device can include a processor, a memory configured to store code and data, and connected to the processor, a charging component connected to the processor, a wireless communication component connected to the processor, and a connectivity unit connected to the processor, such that the processor and memory are configured to perform part or all of the above described methods. The station is optionally able to include a display connected to the processor such that the processor and the memory are configured to display the connectivity configuration of the station and mobile device. The station is optionally able to include an input device connected to the processor, and the processor and memory are configured to receive input from the input device to modify the connectivity configuration. The station is optionally able to have memory configured to store data including a plurality of profiles for respective mobile devices such that where the profiles include wireless power transfer information, connectivity assignments and processing assignment information. Optionally, the processor and memory are configured to separately encrypt the profiles. The connectivity units are able to include a wireless radio unit, a wired connector, or both.

A mobile station configured for wirelessly docking and charging with a station can include a processor, a memory configured to store code and data, and connected to the processor, a wireless power reception component connected to the processor, a wireless communication component connected to the processor, and a connectivity unit connected to the processor such that the processor and memory are configured to receive wireless power from the station via the wireless power reception component, and the processor and memory are configured to transfer a connectivity assignment to the station via the wireless communication component and the connectivity unit. The processor and memory are able to be configured to offload processing to the station, or onload processing from the station. The mobile station is able to include a display connected to the processor, such that the processor and the memory are configured to display the connectivity configuration of the station and mobile device. The mobile station is able to include an input device connected to the processor, such that the processor and memory are configured to receive input from the input device to modify the connectivity configuration. The mobile device is also able to have memory that is configured to store data including a profile for the mobile device, and the profile includes wireless power transfer information, connectivity information and processing assignment information. The mobile station can include a wireless radio unit, a wired connector, or both.

Information Processing System

The present subject matter can be realized in hardware, software, or a combination of hardware and software. A system can be realized in a centralized fashion in one computer system, or in a distributed fashion such that different external devices are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

One or more embodiments may realize one or more benefits, some of which (such as improved efficiency) have been mentioned already. One or more embodiments may be adapted for use with a number of wirelessly powered devices. Some embodiments may be implemented in relatively small space, making them useful for wirelessly powering handheld devices or transferring power to wirelessly powered devices on the limited space of a table or desk.

What is claimed is:

1. A method comprising:
   detecting a presence of a mobile device in proximity to a docking station, the docking station being in communications with at least one external device, each of the at least one external device configured to selectably communicate with the mobile device through a connectivity through the docking station and through a direct connectivity with the mobile device;
   transferring wireless power from the docking station to the mobile device in response to the detecting of the presence of the mobile device;
   establishing a wireless connection between the mobile device and the docking station to support wireless communication;
   receiving a connectivity assignment by the docking station, the connectivity assignment comprising a specification of:
      at least one specified external device, and
      a respective connectivity for each of the at least one specified external device,
      the respective connectivity specifying either of one connectivity selected from:
         a connectivity through the docking station, and
         a direct connectivity between the mobile device and the specified external device;
   establishing the respective connectivity between the mobile device and specified external devices based on the connectivity assignment; and
   generating a display indicating a connectivity configuration, the connectivity configuration comprising:
      an indication of each of the at least one specified external device; and
      an indication of the respective connectivity for each of the at least one specified external device, the indication of the respective connectivity able to indicate either a connectivity through the docking station or a direct connectivity.

2. The method of claim 1, wherein the connectivity assignment is received from one of the mobile device or at least one external device.

3. The method of claim 1 wherein the transferring of wireless power is concurrent with the establishing of the wireless connection between the mobile device and the docking station.

4. The method of claim 1 further comprising transmitting, based upon a user input, an additional connectivity assignment from the docking station to the mobile device, the additional connectivity assignment specifying additional wireless connectivity between the mobile device and the one or more external devices.

5. The method of claim 1 wherein the display indicates the one or more external devices connected to the docking station and the mobile device.

6. The method of claim 1 wherein the display indicates a respective connectivity type for each respective connectivity.

7. The method of claim 1 wherein the display indicates a respective signal strength for each respective connectivity.

8. The method of claim 1 wherein the display indicates a connection status of each respective connectivity.

9. The method of claim 8 further comprising:
   receiving, based on an input received in association with the display, an indication to change the connectivity for a selected external device; and
   modifying the connectivity between the mobile device and the selected external device based on the indication of the change in connection status.

10. The method of claim 9 wherein the docking station receives the indication of a change to the connection status via the one or more external devices.

11. The method of claim 1 further comprising:
    detecting an absence of the mobile device within a first range of the docking station; and
    stopping the transferring of wireless power to the mobile device by the docking station based on detecting the absence of the mobile device within the first range.

12. The method of claim 1, wherein the detecting the presence comprises determining the mobile device is within a first range of the docking station, and wherein establishing the wireless connection comprises:
    establishing, based on determining the mobile device is within the first range of the docking station, a short range docking station connection; and
    terminating, in response to determining the mobile device is not within a first range of the docking station, the short range docking station wireless connection.

13. The method of claim 12, further comprising:
    establishing an initial wireless connectivity between the mobile device and the docking station,
    wherein the determining the mobile device is within the first range is based upon a distance determined by a characteristic of the initial wireless connectivity.

14. The method of claim 13, wherein the detecting the presence comprises determining the mobile device is within a second range of the docking station and outside of the first range of the docking station, the second range being outside of and farther from the docking station than the first range, and
    wherein establishing the wireless connection comprises establishing, based on determining the mobile device is within the second range and outside of the first range, a long range docking station connection.

15. The method of claim 14 further comprising:
    modifying based on determining the mobile device is within the second range and outside of the first range, the each respective connectivity.

16. The method of claim 1 further comprising:
    storing a plurality of profiles, each profile in the plurality of profiles corresponding to a respective mobile device, each profile in the plurality of profiles comprising wireless power transfer information, the connectivity assignment, and processing assignment information for the respective mobile device.

17. The method of claim 16 further comprising separately encrypting each profile in the plurality of profiles.

18. A docking station comprising:
    a processor;
    a memory, coupled to the processor, configured to store code and data;
    a charging component, coupled to the processor, configured to transfer wireless power to a mobile device;
    a proximity detector, coupled to the processor, configured to detect a presence of a mobile device in proximity to the docking station;

a communication component, coupled to the processor, configured to establish wireless communications to the mobile device and communications with at least one external device, each of the at least one external device configured to selectably communicate with the mobile device through a connectivity through the docking station and through a direct connectivity with the mobile device;

a connectivity unit, coupled to the processor, configured to manage communications, through the communications component, between the mobile device and the at least one external device based upon a connectivity assignment, the connectivity assignment comprising a specification of:
  at least one specified external device, and
  a respective connectivity for each of the at least one specified external device,
    the respective connectivity specifying either of one connectivity selected from:
    a connectivity through the docking station, and
    a direct connectivity between the mobile device and the specified external device; and a display unit coupled to the processor, the processor and memory configured to:
  receive an indication of a detection of the presence of the mobile device in proximity to the docking station;
  configure, based on the indication, the charging component to provide power to the mobile device;
  receive the connectivity assignment;
  provide the connectivity assignment to the connectivity unit;
  configure, based on the connectivity assignment, the connectivity unit to establish the respective connectivity between the mobile device and specified external devices;
  generate a display indicating a connectivity configuration, the connectivity configuration comprising:
    an indication of each of the at least one specified external device; and
    an indication of the respective connectivity for each of the at least one specified external device, the indication of the respective connectivity able to indicate either a connectivity through the docking station or a direct connectivity; and
  provide the display on the display.

19. The docking station of claim 18 wherein the processor and memory are further configured to:
  receive, based on an input received in association with the display, an indication to change the connectivity for a selected external device, and
  modify the connectivity between the mobile device and the selected external device based on the change in connection status.

20. The docking station of claim 18 wherein
  the proximity detector is further configured to detect an absence of the mobile device from within a first range of the docking station,
  and the processor and memory are configured to:
    receive, from the proximity detector, an indication of the absence; and
    stop transfer of wireless power to the mobile device in response to the indication.

21. The docking station of claim 18 wherein the proximity detector
  the proximity detector is further configured to detect an absence of the mobile device from within a second range of the docking station,
  and the processor and memory are configured to:
    receive, from the proximity detector, an indication of the absence; and
    modify the one or more wired or wireless connections based on the detecting of the absence of the mobile device within the second range.

22. The docking station of claim 18 wherein the processor and memory are configured to store a plurality of profiles, each profile in the plurality of profiles corresponding to a respective mobile device, each profile in the plurality of profiles comprising wireless power transfer information, the connectivity assignment, and processing assignment information for the respective mobile device.

23. The docking station of claim 22 wherein the processor and memory are configured to separately encrypt each profile in the plurality of profiles.

* * * * *